(12) United States Patent
Kirovski et al.

(10) Patent No.: US 7,734,930 B2
(45) Date of Patent: *Jun. 8, 2010

(54) CLICK PASSWORDS

(75) Inventors: Darko Kirovski, Kirkland, WA (US); Nebojsa Jojic, Redmond, WA (US); Paul Roberts, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 95 days.

This patent is subject to a terminal disclaimer.

(21) Appl. No.: 11/775,159

(22) Filed: Jul. 9, 2007

(65) Prior Publication Data

US 2008/0016369 A1  Jan. 17, 2008

Related U.S. Application Data

(63) Continuation of application No. 10/187,311, filed on Jun. 28, 2002, now Pat. No. 7,243,239.

(51) Int. Cl.
 *H04L 9/00* (2006.01)
(52) U.S. Cl. .................. 713/184; 713/182; 713/183; 713/185; 726/2; 726/3; 726/6; 726/18; 340/5.54; 382/123; 382/160; 382/173
(58) Field of Classification Search ................ 713/169, 713/184; 726/2, 4, 17, 18
See application file for complete search history.

(56) References Cited

U.S. PATENT DOCUMENTS

| 5,465,084 A | 11/1995 | Cottrell | |
| 5,559,961 A * | 9/1996 | Blonder | 726/18 |
| 5,608,387 A * | 3/1997 | Davies | 340/5.27 |
| 5,778,069 A | 7/1998 | Thomlinson et al. | |
| 6,075,905 A * | 6/2000 | Herman | 382/284 |
| 6,185,316 B1 * | 2/2001 | Buffam | 382/115 |
| 6,209,104 B1 * | 3/2001 | Jalili | 726/18 |
| 6,393,305 B1 | 5/2002 | Ulvinen et al. | |
| 6,516,092 B1 | 2/2003 | Bachelder et al. | |
| 6,720,860 B1 * | 4/2004 | Narayanaswami | 340/5.54 |
| 6,788,304 B1 | 9/2004 | Hart et al. | |
| 6,868,190 B1 | 3/2005 | Morton | |
| 6,948,068 B2 | 9/2005 | Lawandy et al. | |
| 6,959,394 B1 * | 10/2005 | Brickell et al. | 726/5 |
| 7,219,368 B2 * | 5/2007 | Juels et al. | 726/2 |
| 7,243,239 B2 * | 7/2007 | Kirovski et al. | 713/184 |
| 7,383,570 B2 * | 6/2008 | Pinkas et al. | 726/2 |

(Continued)

OTHER PUBLICATIONS

Kenneth E Hoff III et al, Fast Computation of Generalized Voronoi Diagrams Using Graphics Hardware, pp. 277-286, ACM, 1999.*

(Continued)

*Primary Examiner*—Eleni A Shiferaw
*Assistant Examiner*—Shanto M Abedin
(74) *Attorney, Agent, or Firm*—Lee & Hayes, PLLC

(57) ABSTRACT

Methods, systems, devices and/or storage media for passwords. An exemplary method tiles an image, associates an index with each tile and optionally determines offsets for select tiles. Further, the tiling optionally relies on probability and/or entropy. An exemplary password system includes an image; a grid associated with the image, the grid composed of polygons; an index associated with each polygon; and an offset associated with each polygon wherein password identification relies on one or more indices and one or more offsets.

16 Claims, 23 Drawing Sheets

U.S. PATENT DOCUMENTS

| | | | |
|---|---|---|---|
| 2001/0037468 | A1 | 11/2001 | Gaddis |
| 2001/0044906 | A1* | 11/2001 | Kanevsky et al. ........... 713/202 |
| 2002/0029341 | A1 | 3/2002 | Juels et al. |
| 2003/0093699 | A1* | 5/2003 | Banning et al. ............. 713/202 |

OTHER PUBLICATIONS

R. Venkatesan et al, Robust Image Hashing, pp. 664-666, IEEE, 2000.*

Jianxin Jeff Yan, A Note on Proactive Password Checking, pp. 127-135, ACM, 2002.*

Jianxin Yan et al, The memorability and security of passwords—some empirical results, pp. 1-13, Technical Report, University of Cambridge, Computer Laboratory, Sep. 2000.*

Ian Jermyn et al, "The Design and Analysis of Graphical Passwords", pp. 1-14, USENIX Association, 1999.*

Ian Jermyn et al, The Design and Analysis of Graphical Passwords, pp. 1-14, Proceedings of the $8^{th}$ USENIX Security Symposium, Aug. 1999.*

Linda Dailey Paulson, Taking a Graphical Approach to the Password, pp. 1-1, News Briefs, Jul. 2002.*

Ari Juels, At the Juncture of Cryptography and Humanity, pp. 1-4, RSA Laboratories, 2002.*

Kenneth E. Hoff III et al, Fast Computation of Generalized Voronoi Diagrams Using Graphical Hardware, pp. 277-286, ACM 1999.*

Birget, et al., "Graphical Passwords", pp. 1-8, Rutgers, 2002.

Bishop, et al. "Improving System Security via Proactive Password Checking", Computers and Security, vol. 14, No. 3, pp. 233 through249, 1995.

Brostoff, et al. Are Passfaces More Usable than Passwords A Field Trial Investigation, SIGSAC ACM Special Interest Group on Security, Audit, and Control, pp. 41through 50, 2001.

Curtis, et al. "Computer Generated Watercolor", SIGGRAPH '97, Los Angeles, CA, 10 pp. Aug. 1997.

Dhamija, et al. "Deja vu, A User Study Using Images for Authentication", 9th USENIX Security Symposium, 14 pp. Aug. 2000.

Dhamija, "Hash Visualization in User Authentication", Proceedings of the Computer Human Interaction 2000 Conference, 2 pp, Apr. 2000.

Feldmeier, et al. "UNIX Password Security Ten Years Later", Proceedings of Crypto'89, published as Lecture Notes in Computer Science, No. 435, Springer Verlag, pp. 44 through 63, 1989.

Jermyn, et al. "The Design and Analysis of Graphical Passwords", 8th USENIX Security Symposium, 15 pp. Aug. 1999.

Kenneth, et al, "Fast Computation of Generalized Voronoi Diagrams Using Graphics Hardware", pp. 277-286, ACM, 1999.

Klein, "Foiling the Cracker A Survey of and Improvements to, Password Security", Proceedings of the Second USENIX Security Workshop, 11 pp. Aug. 2, 1990.

Lipton, "Logical Authentication Methods", pp. 9-20, ACM SIGSAC Review, vol. 4, Issue 2, 1986.

Morris, et al. "Password Security A Case History", Communications of the ACM, vol. 22, No. 11, pp. 594 through 597 Nov. 1979.

Perlin, "An Image Synthesizer", Computer Graphics, vol. 19, No. 3, pp. 287-296 Jul. 1985.

Perrig, et al., Hash Visualization a New Technique to Improve Real World Security, Proceedings of the 1999 International Workshop on Cryptographic Techniques and E Commerce, pp. 131-138 1999.

Sobrado, "Graphical Passwords", at <<http://rutgersscholar.rutgers.edu/volume04/sobrbirg/sobrbing.htm>>, Leonardo Sobrado and Jean-Camille Birget, 2002, pp. 8.

Venkatesan, et al., Robust Image Hashing, pp. 664-666, IEEE, 2000.

Wertheimer, "Laws of Organization in Perceptual Forms", A Source Book of Gestalt Psychology by Willis D. Ellis, Chapter 5, Routledge and Kegan Paul Ltd., London, pp. 71 through 88 1938.

Wood, et al. "The Rorschach Inkblot Test: A Case of Overstatement", Assessment, vol. 6, No. 4, pp. 341 through 351 1999.

Yan, et al. "The Memorability and Security of Passwords Some Empirical Results", Technical Report No. 500, Computer Laboratory, University of Cambridge, 11 pp. 2000.

\* cited by examiner

CLICK PASSWORDS

RELATED APPLICATIONS

This patent application is a continuation application of U.S. patent application Ser. No. 10/187,311, entitled "Click Passwords", filed on Jun. 28, 2002 (now U.S. Pat. No. 7,243, 239), which is incorporated by reference herein.

TECHNICAL FIELD

This invention relates generally to methods, devices, systems and/or storage media for graphical passwords.

BACKGROUND

As communication enabling technologies such as the Wireless Access Protocol and Bluetooth have resulted in a recent proliferation of mobile computation platforms such as browser-enabled wireless phones, Pocket PCs, wearable computers, and Internet appliances, application developers have focused on porting software onto these miniature computers. Since graphical input commonly dominates keyboard on such systems, many routines, such as a logon process, require adaptation to touch-pads and stylus mediated human-computer interaction. Technologies for accomplishing such tasks, as well as other tasks, are presented below.

SUMMARY

Methods, systems, devices and/or storage media for passwords. An exemplary method tiles an image, associates an index with each tile and optionally determines offsets for select tiles. Further, the tiling optionally relies on probability of, for example, pixel, region and/or tile selection, and/or entropy, for example, entropy of a password space. An exemplary password system includes an image; a grid associated with the image, the grid composed of polygons; an index associated with each polygon; and an offset associated with each polygon wherein password identification relies on one or more indices and one or more offsets. Other exemplary methods, systems, devices and/or storage media are also disclosed.

Additional features and advantages of the various exemplary methods, devices, systems, and/or storage media will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
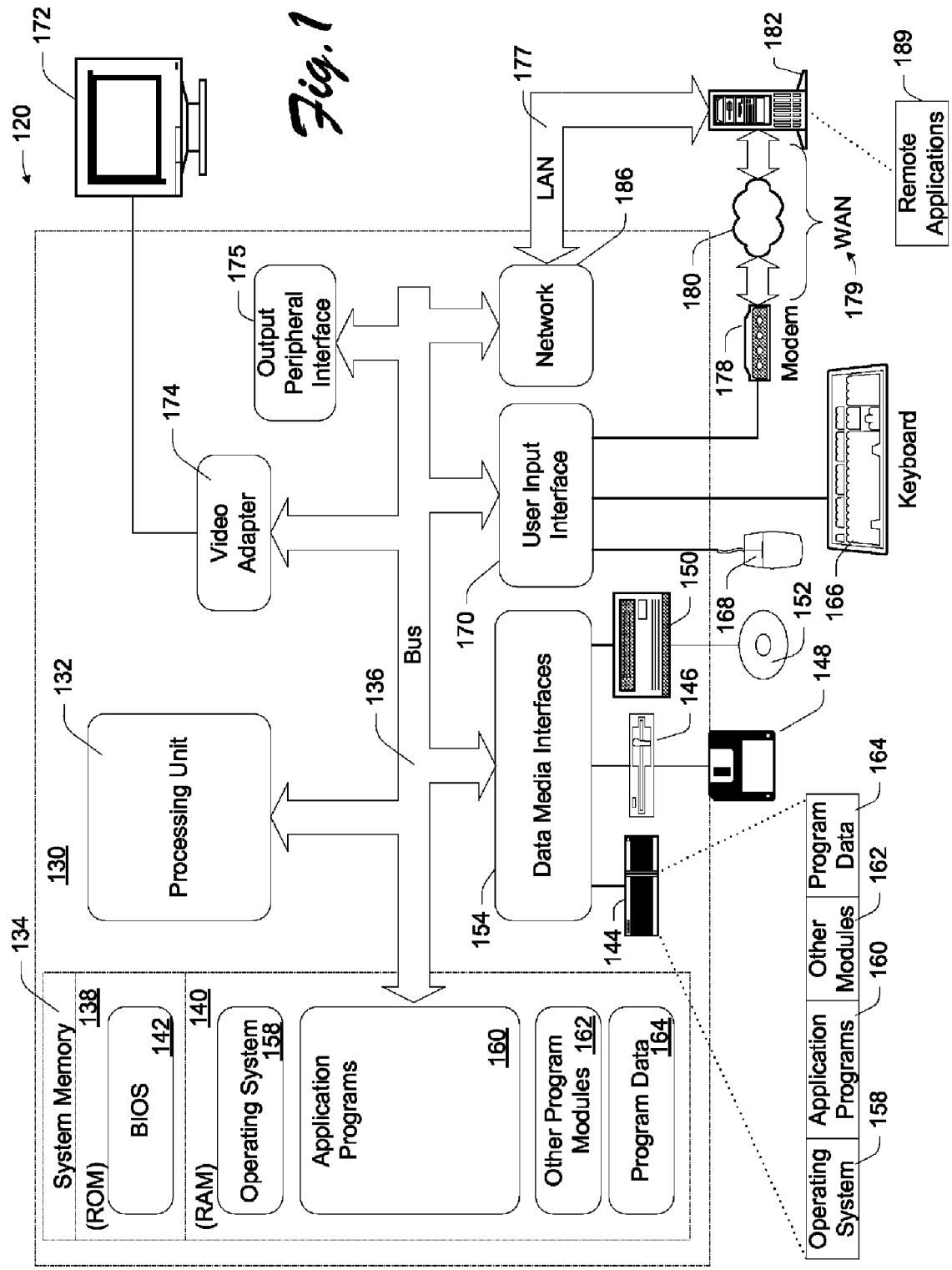
FIG. 1 is a block diagram illustrating an exemplary computer and/or computing environment suitable for use with various exemplary systems, methods, and media described herein.

Turning to the drawings, wherein like reference numerals refer to like elements, various methods are illustrated as being implemented in a suitable computing environment. Although not required, the methods will be described in the general context of computer-executable instructions, such as program modules, being executed by a personal computer and/or other computing device. Generally, program modules include routines, programs, objects, components, data structures, etc. that perform particular tasks or implement particular abstract data types. Moreover, those skilled in the art will appreciate that various exemplary methods may be practiced with other computer system configurations, including hand-held devices, multi-processor systems, microprocessor based or programmable consumer electronics, network PCs, mini-computers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control of the stimulation device. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Various technologies are described herein that pertain generally to password systems and/or methods. Many of these technologies can enhance security and/or simplify password secured transactions (e.g., logon, etc.).

FIG. 1 illustrates an example of a suitable computing environment 120 on which the subsequently described methods and/or storage media may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
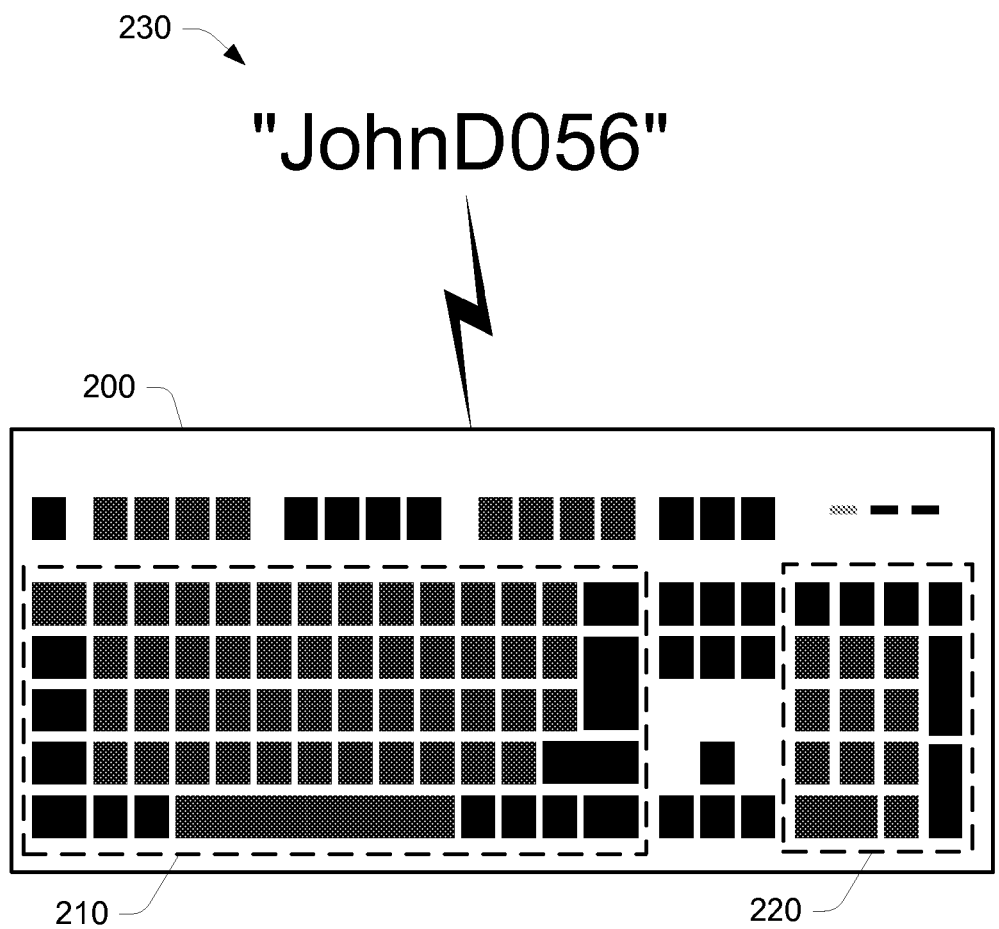
FIG. 2 is a block diagram illustrating a keyboard-based alphanumeric password system.

Referring to FIG. 2, a typical alphanumeric keyboard 200 is shown (e.g., see keyboard 166 of FIG. 1). The keyboard 200 includes an alphanumeric section 210 and a numeric section 220. Such a keyboard 200 is suitable for entering an alphanumeric password 230, for example, the eight character password "JohnD056". The set of potential characters generally includes 26 capitals, 26 lower case and numbers from 0 to 9 and/or others found on a typical keyboard. Some keyboards allow for approximately 95 characters, which for an 8 character password, results in a password space greater than $10^{15}$.

Figure 3:
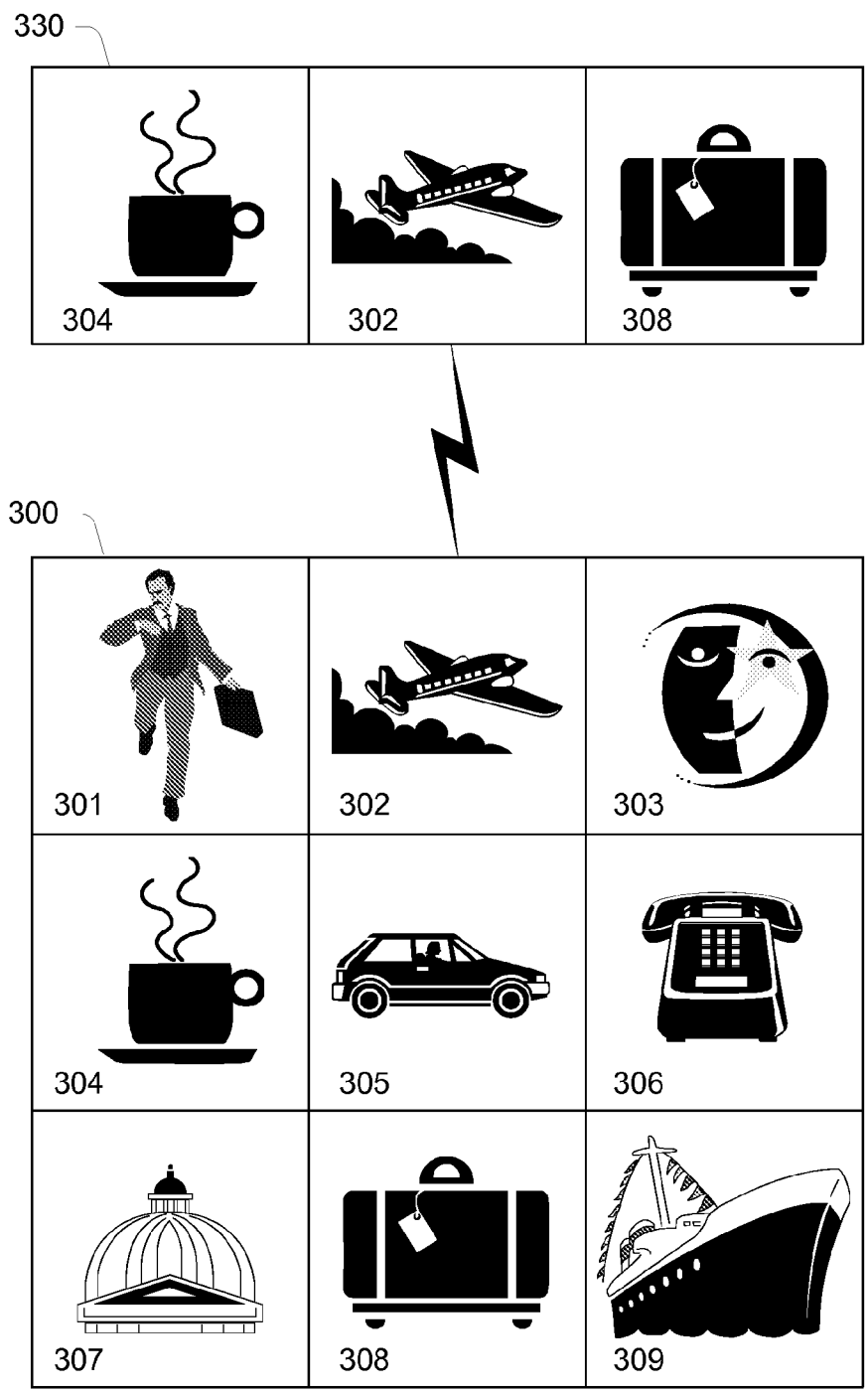
FIG. 3 is a block diagram illustrating a picture-based or icon-based password system.

Referring to FIG. 3, a display of nine pictures 300 is shown. Individual pictures are selectable using a keyboard, pointing device, etc. The pictures are arbitrary and include: a running man 301, an airplane 302, a smiling face 303, a cup of coffee 304, a car 305, a telephone 306, a dome 307, a suitcase 308, and a ship 309. Such a display 300 is suitable for entering a "picture" password 330, such as, "cup of coffee 304, airplane 302, and suitcase 308". Such a display requires a user to memorize pictures as opposed to characters or words.

Figure 4:
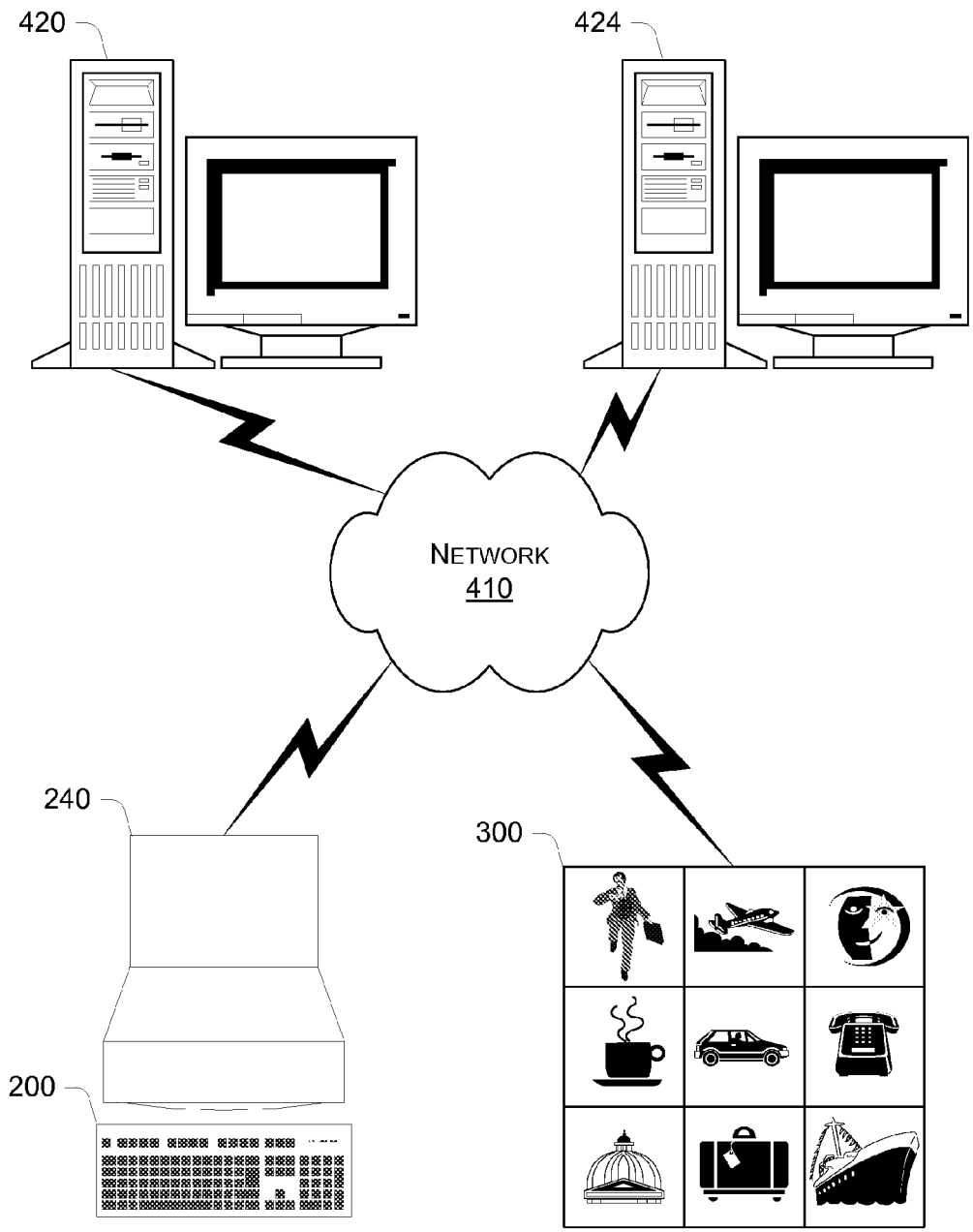
FIG. 4 is a block diagram illustrating a typical computing environment for use with alphanumeric or picture-based (or icon-based) password systems.

Referring to FIG. 4, a system 400 is shown. The system 400 includes the keyboard 200 of FIG. 2 and the display 300 of FIG. 3 along with a network 410 and one or more remote computers 420, 424. A monitor 240 is also shown in conjunction with the keyboard 200. The keyboard 200 and the display 300 are in communication with the network 410, for example, via a local client computer or computing device (not shown). According to the system 400, logon to a local and/or remote computer (or computing device) requires a password; thus, a user may logon on to a local computer and/or one of the remote computers 420, 424 by entering passwords via the keyboard 200 or the display 300.

For a user to logon to one of the remote computers 420, 424 using a password, the remote computers 420, 424 typically compare the user entered password to information contained in memory. In general, a variety of authentication protocols exist, which, for example, include Kerberos, SMB, EKE, SPEKE, B-SPEKE, SRP, etc. Such protocols optionally support remote password-based authentication over an untrusted or insecure communication channel. For example, Kerberos is typically a centralized shared-secret ticket-based network authentication system and SMB is typically a challenge-based protocol that does not involve password transport to a remote server but a proof of a successful challenge test at a client.

Figure 5:
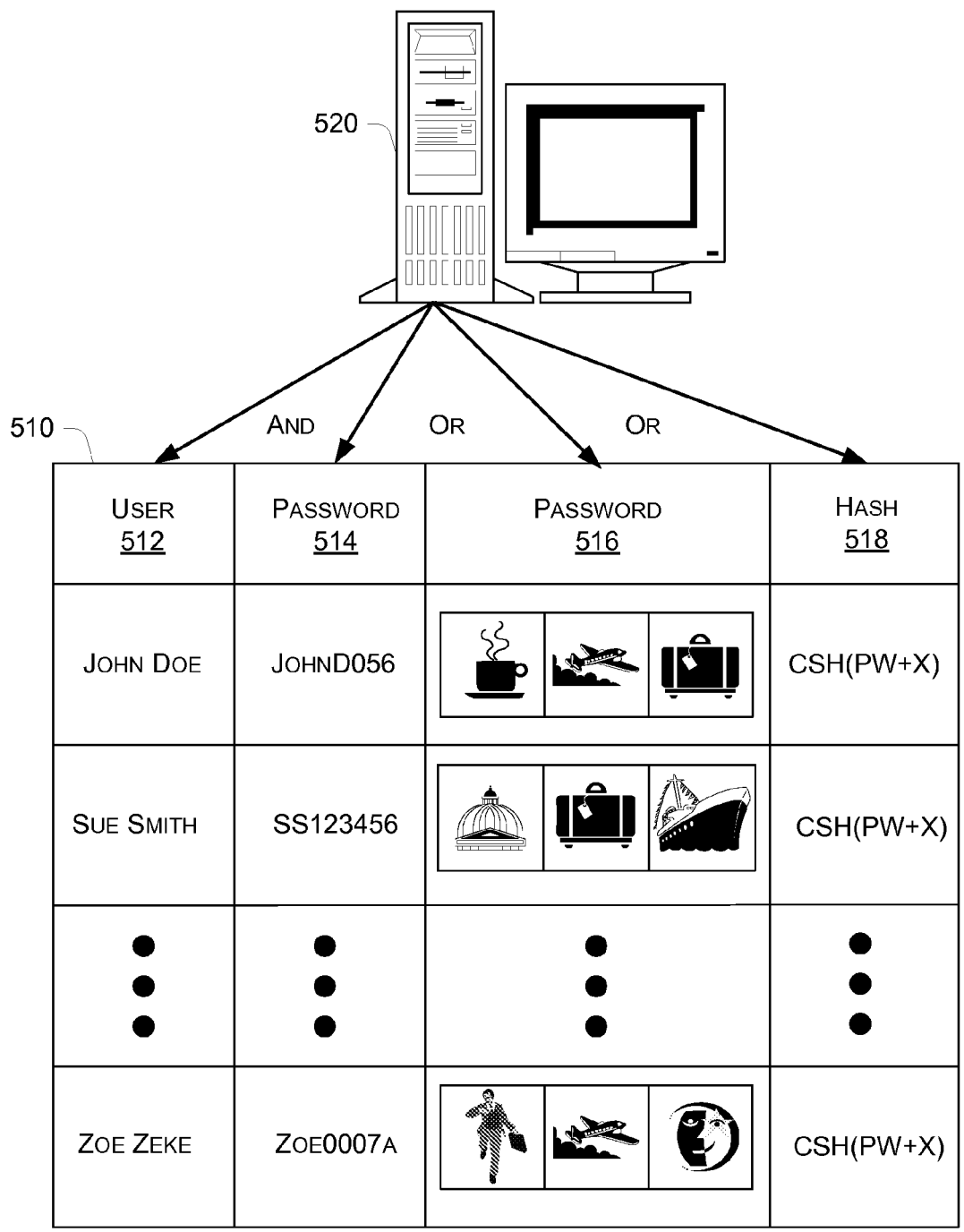
FIG. 5 is a block diagram illustrating a data table for use with alphanumeric or picture-based (or icon-based) password systems.

Referring to FIG. 5, an information table 510, associated with a computer 520, is shown. The information table 510 includes a user information column 512, an alphanumeric password information column 514, a picture password information column 516 and a hash information column 518. Note that the table 510 associates each user with an alphanumeric password information entry or a picture password information entry. The alphanumeric password information column 514 includes an eight character password (e.g., "JohnD056", "SS123456", etc.) for each user while the picture password information column 516 includes a series of three pictures (e.g.: "cup of coffee, airplane, suitcase"; "dome, suitcase, ship"; etc.) for each user. While actual "passwords" appear in two of the columns 514, 516, such passwords are often "hashed" and/or combined with other information and "hashed", as shown in the hash information column 518. Hash information optionally includes password and other information, such as, user information. For example, in the hash information column 518, CHS(PW+X) includes password information (PW) and other information (X) and CHS represents a hash function.

Hashing typically involves use of a hash function (e.g., "MD5", "SHA-1", etc.) to reduce or condense the password and other information. The Secure Hash Algorithm (SHA) was developed by the National Institute of Standards and is specified in the Secure Hash Standard (SHS, FIPS 180). A revised version, entitled SHA-1, was published in 1994 (e.g., see ANSI X9.30 standard). SHA-1 produces a 160-bit (20 byte) message digest. MD5 was developed by Prof. R. Rivest (MIT, Cambridge, Mass.) in 1994 and has a 128 bit (16 byte) message digest. Various hash functions produce a message digest or "fingerprint" that is generally non-reversible: data cannot be retrieved from the fingerprint, yet the fingerprint aims to uniquely identify the data.

A traditional approach to logging onto a system typically involves typing a password associated with a username. When a password is entered for the first time, such a system computes a secure hash of the entered password and stores it into one of the system files (e.g., on UNIX systems "/etc/passwd"). At logon, the system computes again the hash of the entered password and compares this value with the stored one, a process known as "hash check". If the computed hash and the stored hash match, the user is granted access. In order to prevent a user from identifying another user with the same password, before hashing, passwords are usually salted with a user-specific random variable (e.g., two characters in UNIX) which is also stored in the password information file (e.g., file name "passwd"). Although security of such a login mechanism has provable reliability, one of the most common attacks to a system that relies on alphanumeric characters is the dictionary attack.

Of course, a dictionary attack can be launched off-line and/or on-line. Regarding on-line attacks, the success rate for such attacks can be diminished substantially by prohibiting access to a system after a certain number of unsuccessful logins. Indeed, various exemplary password systems and/or methods described herein optionally implement such a strategy against attacks. Regarding off-line attacks, it is typically more difficult to prevent such attacks; it may also be difficult to prevent attacks where the adversary ultimately obtains an entire password information file through a virus, Trojan horse, as a system user, etc. Various aspects of various exemplary password systems and/or methods are optionally implemented to diminish the success of off-line attacks. For example, an exemplary password system optionally stores a password image at one site and authentication information at another site. Of course, other aspects are optionally implemented in an exemplary system and/or method to diminish and/or eliminate success of various off-line attacks.

Figure 6:
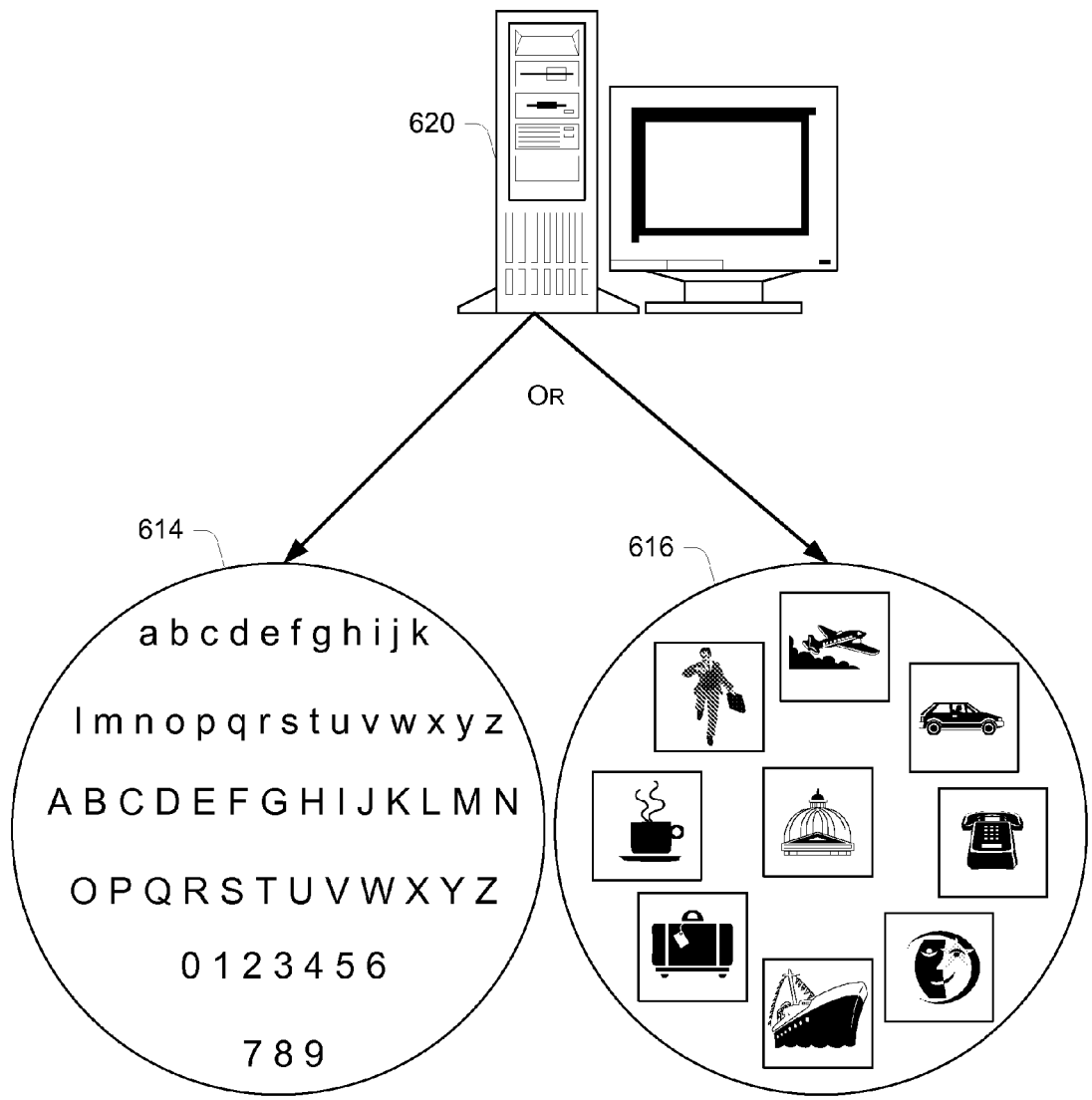
FIG. 6 is a block diagram illustrating data sets for typical alphanumeric or picture-based (or icon-based) password systems.

Referring to FIG. 6, a computer 620, a set of alphanumeric characters 614, and a set of pictures 616 are shown. At the time of password selection or creation, the aforementioned password systems that rely on alphanumeric characters typically require knowledge of the set of alphanumeric characters 614. For example, a user inputs the eight character password "JohnD056". Next, the computer 620 receives the eight characters and performs a hash operation using a hash function to produce a fingerprint. In this example, the computer 620, which is optionally a remote computer, contains the entire alphanumeric character set, which is the same alphanumeric character set available to the user, for example, at a local computer (or entry device, computing device, etc.). In general, in such systems, an adversary can easily obtain or determine the set of alphanumeric characters by accessing the computer 620.

In the case of aforementioned picture systems, the computer 620 either contains the set of pictures 616 or contains an alpha and/or numeric character map of the set of pictures 616. For example, referring to FIG. 3, individual pictures in the set of pictures 616 have corresponding numbers 301 through 309. Thus, the computer 620 may contain numbers 301 through 309. In such a picture/number system, an adversary may rather easily back out the correspondence between pictures and numbers. Further, given the display (e.g., organization of the pictures 301-309), an adversary may readily detect the correspondence between pictures and numbers, especially where distinct boundaries exist between individual pictures. Various technologies are discussed below that aim to alleviate and/or minimize at least some of the issues associated with the aforementioned alphanumeric or picture systems.

Figure 7:
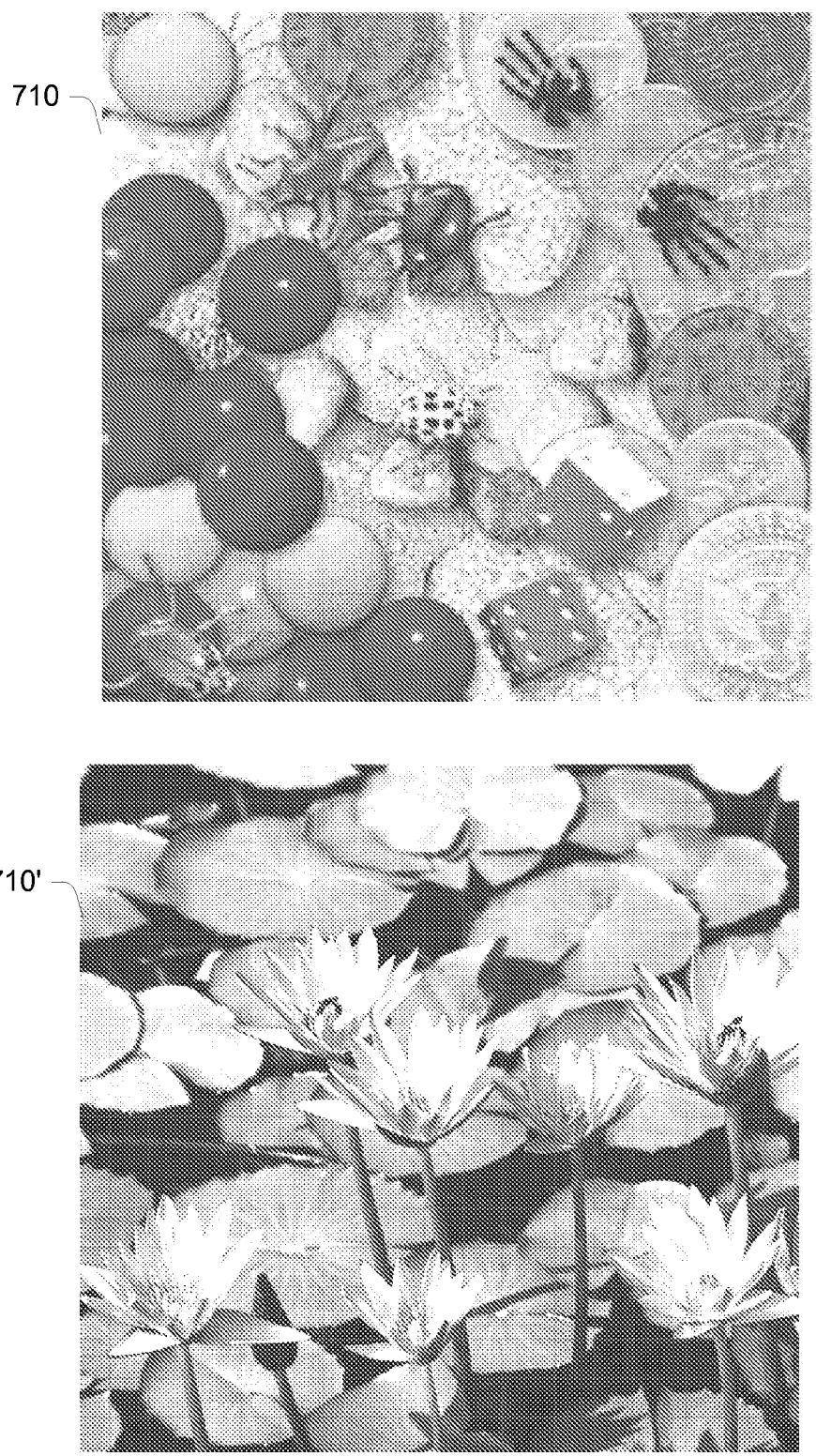
FIG. 7 shows two exemplary images optionally suitable for use with exemplary systems and/or methods described herein.

As discussed herein, various exemplary systems rely on images having a variety of features. For example, referring to FIG. 7, two images 710, 710' are shown. The top image 710 includes bugs, coins, dice, tokens, etc. The lower image 710' includes flowers, stems, lily pads, etc. An exemplary password system optionally presents one or more images to a user to initiate a password selection or creation process. For example, an exemplary password system presents a user with the image 710, or alternatively, the user selects image 710 from a group of two or more images. According to this exemplary password system, once the user selects the image 710, the system determines a grid for the image 710. Of course, an exemplary system may already have a predefined grid for an image. In general, images, such as the images 710, 710', are composed of a plurality of picture elements or pixels. Often a mouse or other pointing or selection device can be used to select an individual pixel and/or groups of pixels. While the term "click" password is used herein at times (e.g., as in clicking a mouse button, a button on another selection and/or pointing device, touching a touch screen, etc.) other suitable manners of selection are also encompassed within and/or suitable for use by various exemplary systems and/or methods disclosed herein.

Figure 8:
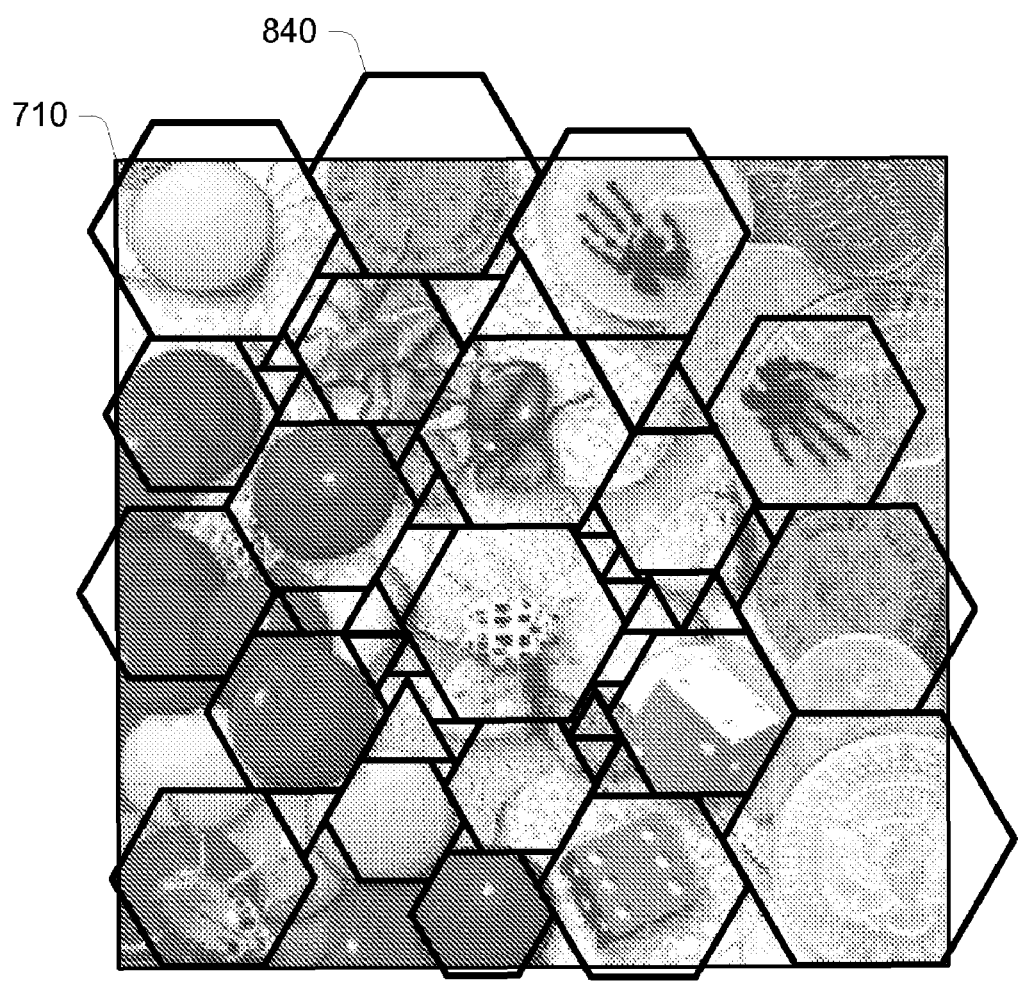
FIG. 8 shows one of the images of FIG. 7 and illustrates a corresponding exemplary grid for use with exemplary systems and/or methods described herein.

Referring to FIG. 8, the image 710 is shown along with a corresponding grid 840. The nature of suitable grids is discussed in more detail below. For purposes of describing a more general exemplary password system, a detailed description of gird determination is not necessary. The grid 840 includes various polygons, such as, hexagons, triangles, and tetragons. Further, various subjectively and/or objectively prominent features lie within various polygons. For example, various tokens, die, bugs, coins, etc. lie, at least partially, within a hexagon. In this exemplary password system, the hexagons in the grid 840 are used to create a password space or set.

Figure 9:
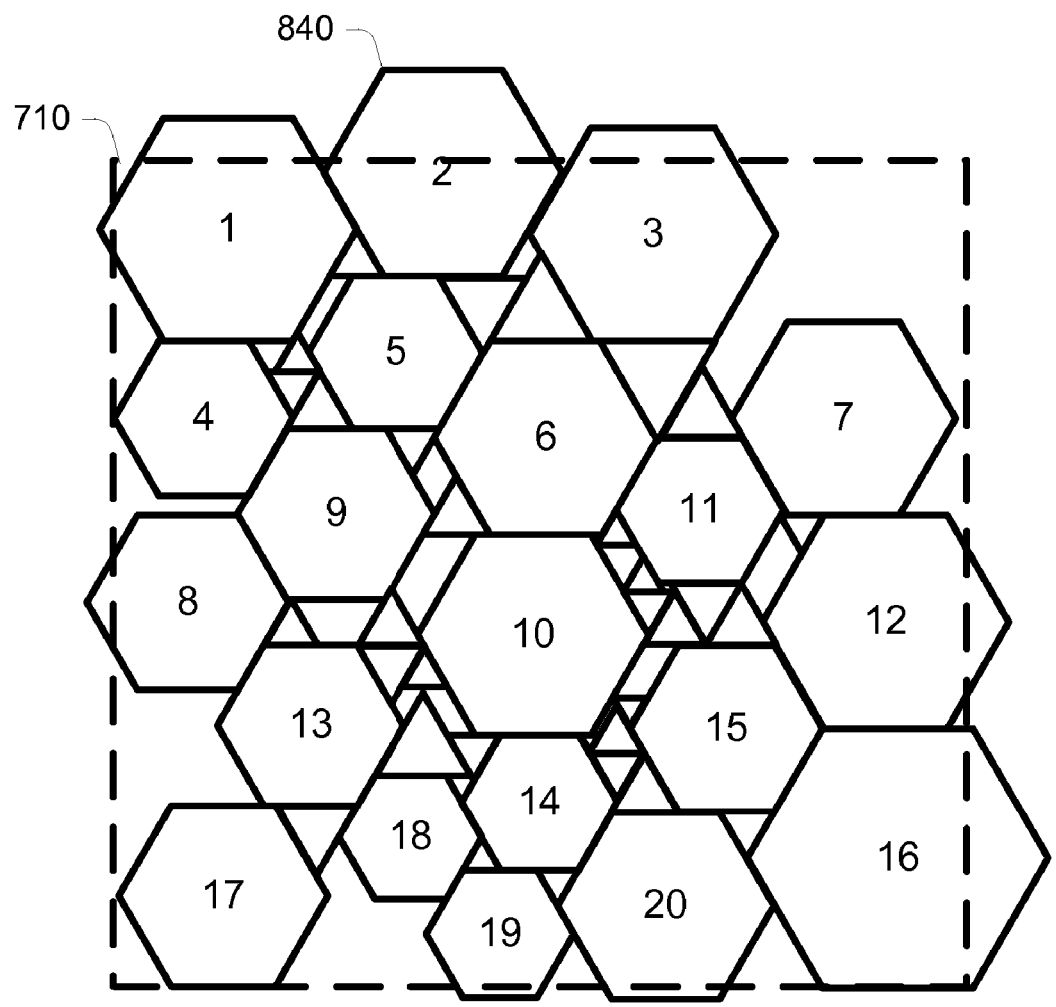
FIG. 9 illustrates the exemplary grid of FIG. 9 without the selected image of FIG. 7.

Referring to FIG. 9, the grid 840 is shown wherein individual hexagons contain numbers (e.g., 1 to 20). While the grid 840 contains twenty hexagons, other grids optionally contain a set having more or less polygons. Also note that the polygons optionally extend beyond the border of an image (e.g., the image 710) and/or do not entirely fill the entire space of the image (e.g., the image 710). In addition, the boundaries of the polygons are optionally pixilated to correspond to image pixels. According to the instant exemplary password system, a user selects one or more pixels, a group of pixels, a coordinate and/or a set of coordinates. In addition, a user may make several of such selections. For example, a user may select three pixels wherein each pixel has a corresponding set of coordinates.

Figure 10:
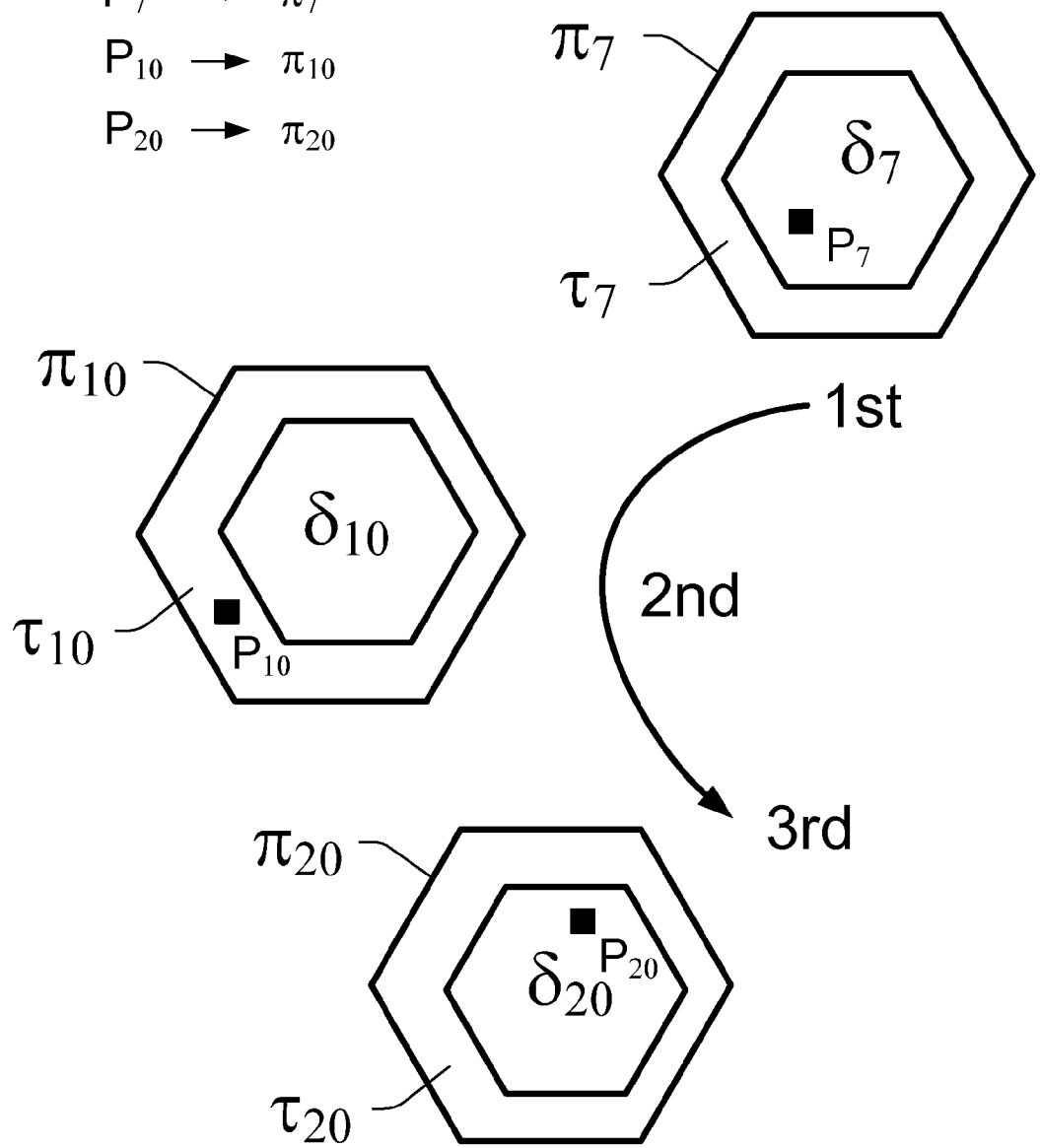
FIG. 10 is a diagram illustrating select polygons of the grid of FIG. 9 as selected in an exemplary password system and/or method.

Referring to FIG. 10, polygon 7 ($\pi_7$), polygon 10 ($\pi_{10}$), and polygon 20 ($\pi_{20}$) of the grid 840 are shown as 1st, 2nd, and 3rd user selections, respectively. Thus, the user selected password corresponds to polygons $\pi_7$, $\pi_{10}$, and $\pi_{20}$, which, in turn, infers that the user selected a first pixel $P_7$ in the region bound by polygon $\pi_7$, a second pixel $P_{10}$ in the region bound by polygon $\pi_{10}$, and a third pixel $P_{20}$ in the region bound by polygon $\pi_{20}$. In addition, each of the polygons is further segmented into a core region "δ" and a tolerance region "τ". Note that each user selected pixel may fall within a core region "δ" (e.g., $P_7$ and $P_{20}$) or a tolerance region "τ" (e.g., $P_{10}$). In general, the tolerance is defined by a distance, for example, a Euclidean distance "∈". In general, a Euclidean distance or tolerance is defined globally; however, a tolerance may also be defined on a polygon-by-polygon basis wherein each polygon $\pi_i$ has an associated tolerance $\in_i$. This distance generally defines the maximum allowable distance for transforming the position of a selected pixel in τ to a position in δ. For example, given a polygon $\pi_i$, and a corresponding core region $\delta_i$, the corresponding tolerance region may be defined as: $\tau_i = \pi_i - \delta_i$. According to this equation, any pixel in $\tau_i$ is transformable to a pixel in $\delta_i$ wherein the distance is less than (or equal to) a tolerance ∈. A logon process typically differs from a password selection or creation process as discussed further below.

More formally, ∈ is optionally defined as follows:

$$(\forall P \in \delta_i)(\forall Q \notin \pi_i) \|P-Q\| > \in$$

wherein Q is a selected pixel that does not belong to the set of pixels that make up a given polygon $\pi_i$. In a typical Cartesian coordinate system used for pixel images, the distance $\|P-Q\| > \in$ is optionally calculable by the following equation:

$$\|P(x_p, y_p) - Q(x_q, y_q)\| = \sqrt{(x_p - x_q)^2 + (y_p - y_q)^2}$$

Of course, other coordinate systems are optionally suitable; however, in general, an image-based password system typically uses one or more tolerances. A tolerance is optionally determined and/or set during an image analysis process and/or tiling process. For example, an image segmentation process optionally segments an image and determines an appropriate tolerance and/or tolerances. Image analysis optionally includes, without limitation, an analysis implementing filters, edge detection, segmentation, connectivity, contours, thresholds, etc.

Figure 11:
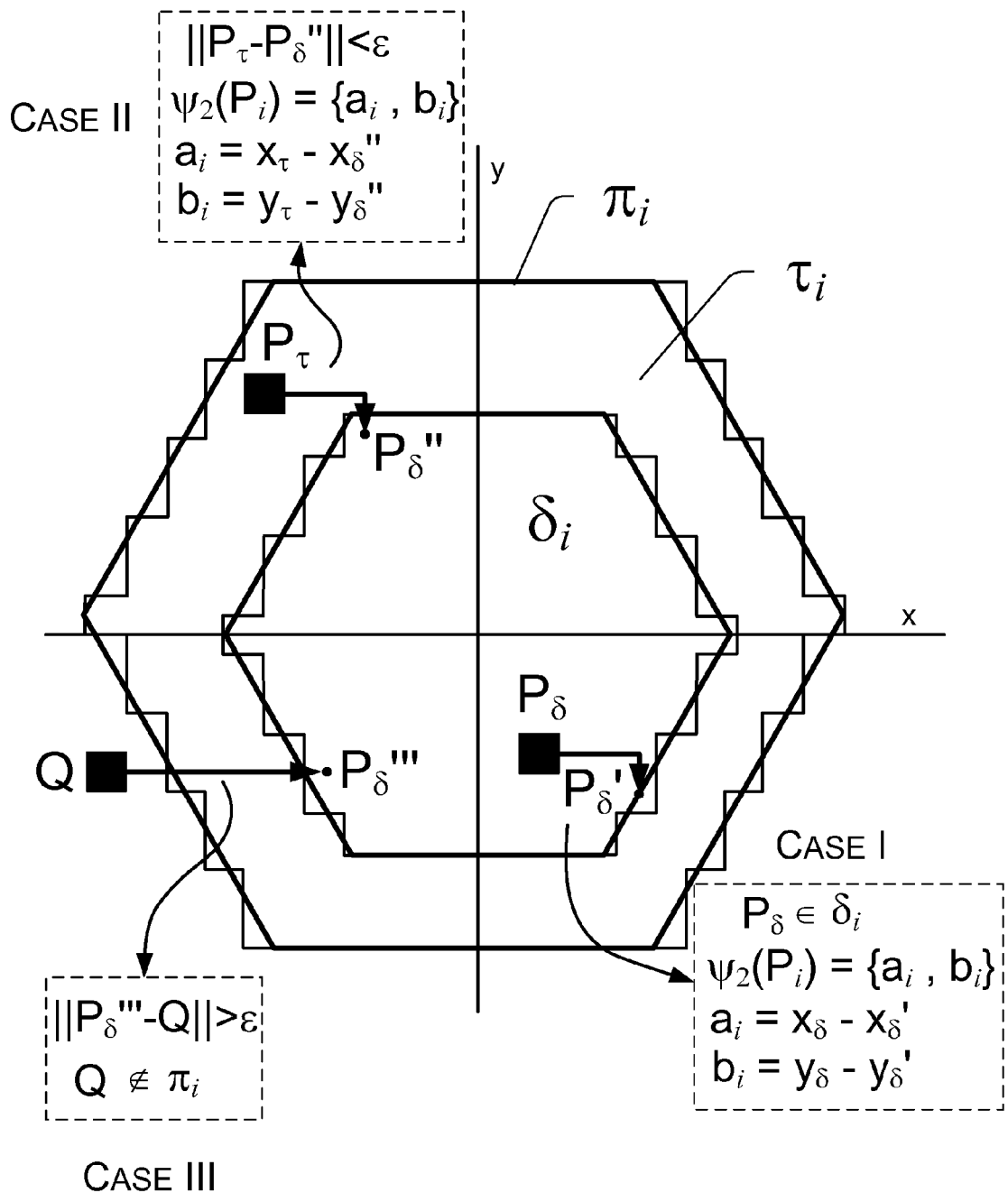
FIG. 11 is a diagram illustrating an exemplary polygon having a core region and a tolerance region.

According to the instant exemplary password system, one or more consequences may stem from a user selected pixel "P" falling within a core region "δ" or a tolerance region "τ" of a polygon "π" during password selection or creation. Referring to FIG. 11, an illustrative exemplary password setup diagram is shown. A pixilated polygon $\pi_i$ includes a core region $\delta_i$ and a tolerance region $\tau_i$. Also shown are x and y axes of a planar coordinate system wherein each pixel has a corresponding (x, y) set of coordinates that can determine pixel position. In a password selection process, a variety of different selection cases are possible; FIG. 11 illustrates three cases: Case I, Case II and Case III.

In Case I, a user selects a pixel $P_\delta$ contained within $\delta_i$ of $\pi_i$. Because $P_\delta$ is contained within $\delta_i$, the selected pixel $P_\delta$ maps to the polygon $\pi_i$ and is assigned as $P_i$, where the index "i" corresponds to the polygon $\pi_i$. In addition, an offset is optionally calculated that corresponds to $P_i$ and $\pi_i$, for example, wherein the offset corresponds to a difference between $P_\delta(x_\delta, y_\delta)$ and $P_\delta'(x_\delta', y_\delta')$. As shown in FIG. 11, for Case I, the offset $\psi_2(P_i) = \{a_i, b_i\}$ wherein $a_i = x_\delta - x_\delta'$ and $b_i = y_\delta - y_\delta'$. While this example uses a single offset other examples may use more than one offset. In addition, any particular offset is optionally selected randomly from a set of offsets. Further, a set of offsets optionally includes all possible offset that when applied to $P_\delta(x_\delta, y_\delta)$ maintain in $\delta_i$. As discussed further below, an offset (e.g., $\psi_2(P_i)$) is optionally used at logon in a logon process.

In Case II, a user selects a pixel $P_\tau$ contained within $\tau_i$ of $\pi_i$. Because $P_\tau$ is contained within $\tau_i$, the selected pixel $P_\tau$ maps to the polygon $\pi_i$ and is assigned as $P_i$, where the index "i" corresponds to the polygon $\pi_i$. In addition, an offset is optionally calculated that corresponds to $P_i$ and $\pi_i$, for example, wherein the offset corresponds to a difference between $P_\tau(x_\tau, y_\tau)$ and $P_\delta''(x_\delta'', y_\delta'')$. As shown in FIG. 11, for Case II, the offset $\psi_2(P_i) = \{a_i, b_i\}$ wherein $a_i = x_\tau - x_\delta''$ and $b_i = y_\tau - y_\delta''$. While this example uses a single offset other examples may use more than one offset. In addition, any particular offset is optionally selected randomly from a set of offsets. Further, a set of offsets optionally includes all possible offsets that when applied to $P_\tau(x_\tau, y_\tau)$ transform $P_\tau(x_\tau, y_\tau)$ to positions in $\delta_i$. As discussed further below, an offset (e.g., $\psi_2(P_i)$) is optionally used at logon in a logon process.

In Case III, a user selects a pixel Q, wherein Q is not contained within $\pi_i$ or optionally, $\|P_\delta'' - Q\| > \in$, wherein $P_\delta''$ is the closest pixel to Q within $\delta_i$. Because Q is not contained within $\pi_i$, the selected pixel Q does not map to the polygon $\pi_i$. Of course, this particular pixel may optionally map to another polygon (e.g., wherein Q is contained within a region such as $\tau_i$ or $\delta_i$ of another polygon).

In the instant exemplary password system, wherein a user has selected $\pi_7$, $\pi_{10}$, and $\pi_{20}$, information is typically stored in the form of three main components: $\psi_0$, $\psi_1$, $\psi_2$. Of course, storage of fewer or more components is also possible. Of the three exemplary components, the first component $\psi_0$ contains information corresponding to a user, for example, a pointer to a user; the second component $\psi_1$ contains information corresponding to a hash of the selected polygons (e.g., $\pi_7$, $\pi_{10}$, and $\pi_{20}$); and the third component $\psi_2$ contains information corresponding to, for example, a random selection of an offset from a set of offsets corresponding to each of the selected polygons; thus, $\psi_2$ contains as many entries as selected polygons as subsidiary components (e.g., $\psi_2(P_7, P_{10}, P_{20}) = [\{a_7, b_7\}, \{a_{10}, b_{10}\}, \{a_{20}, b_{20}\}]$). Of course, a single offset not selected from a set of offsets is also possible. In addition, the order of exemplary components may vary from the order presented above. Yet further, any suitable format is optionally used to store or order components. For example, exemplary components are optionally stored as one or more vectors, one or more arrays, etc.

While a variety of hash functions and/or manners of selection are possible, the instant exemplary password system optionally relies on one or more of the equations that follow.

$$\psi_1 = CSH\left(\sum_{i=1}^{p} L^{i-1} \cdot (j \mid P_i \in \pi_j \wedge P_i \in C_p)\right)$$

In the above equation, CSH is a hash function, typically a cryptographically secure hash function, p corresponds to the number of selected polygons in the set of L polygons and $C_p$ corresponds to the "password".

$$\psi_2(P_i) = rand\left[\left(\bigcup_{\forall P_k \in \delta_j} \{(x_k - x_i), (y_k - y_i)\}\right) \cap \Psi\right]$$

In the above equation, $\psi_2$ is an ordered set of p pairs of integer numbers $\psi_2 = \{Z, Z\}^p$, where the i-th pair $\psi_2(P_i) = \{a_i, b_i\} \in \psi_2$ is denoted as the transform or offset if a password pixel $P_i(x_i, y_i) \in \pi_j$. Further, $x_k$ and $y_k$ are the coordinates of $P_k$, rand(t) returns a random element from the set t, and $\Psi$ is a set of all possible transforms or offsets that can occur in $\Pi$.

$$\Psi = \{0, 0\} \cup \left(\bigcup_{\forall \pi_i \in \Pi} \bigcup_{\forall P_j \in \tau_i} \{(x_q - x_i), (y_q - y_i)\}\right),$$

$$Q = (x_q, y_q) = \operatorname*{argmin}_{Q \in \delta_i}(\|P_j - Q\|)$$

For a given $\in$, the set of all possible transforms (or offsets) $\Psi$ in the set of polygons $\Pi$ is limited to:

$$\Psi \subseteq \{\{a, b\} \mid a, b \in Z, |a| \leq \in, |b| \leq \in\}$$

Of course, various exemplary password systems described herein are not limited to use of the aforementioned equations. Further, more or fewer main components and/or subsidiary components may be used. For example, salting may occur prior to the hash operation wherein the salt is optionally stored as another component (e.g., a fourth main component, $\psi_3$).

Figure 12:
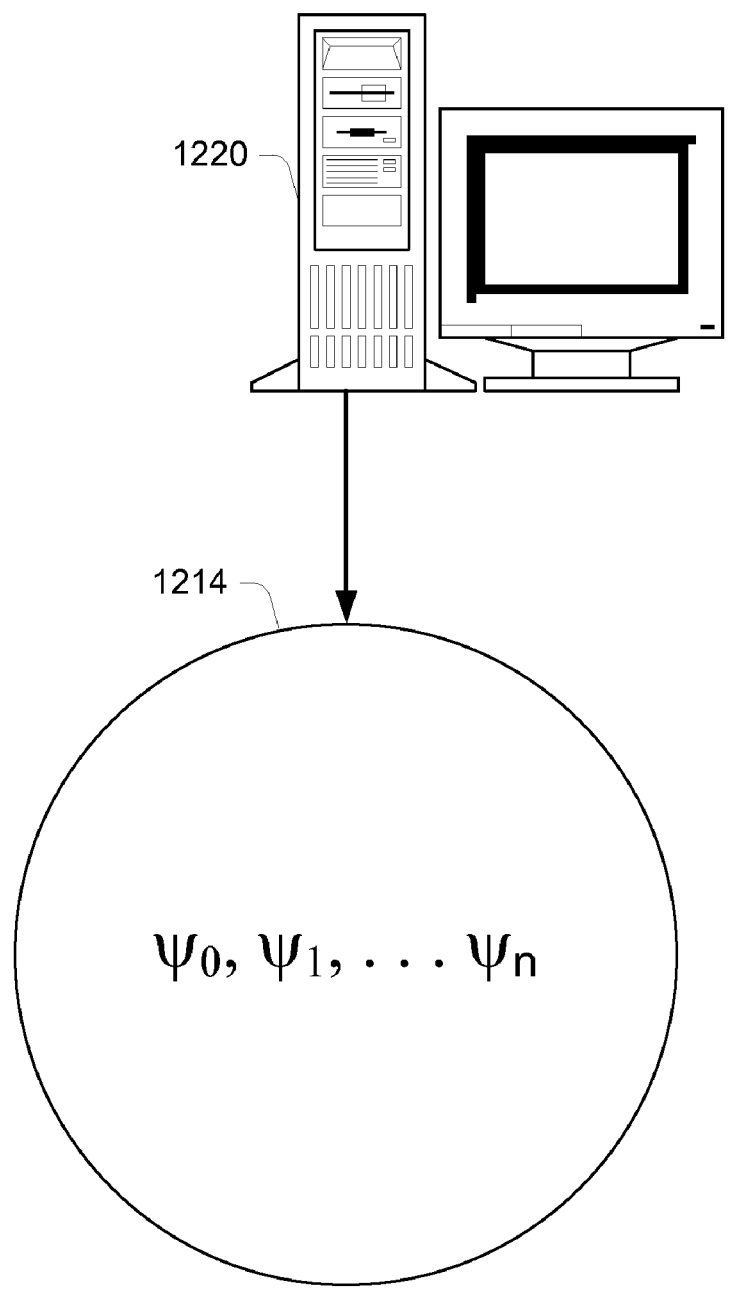
FIG. 12 is a block diagram illustrating an exemplary data set for an exemplary password system and/or method.

Referring to FIG. 12, a computer 1220 and a data set of password components 1214 are shown. According to the aforementioned exemplary password system, a remote computer (e.g., computer 1220) may optionally contain the set of password components only. In other words, a remote computer does not need to contain the image displayed to the user. In such an exemplary password system, while an adversary may obtain a set of password components, it is unlikely that the adversary would be able to use such information to re-create a logon experience. This is particularly so if the adversary does not have the user image and, even if the adversary has the user image, the grid remains unknown.

Figure 13:
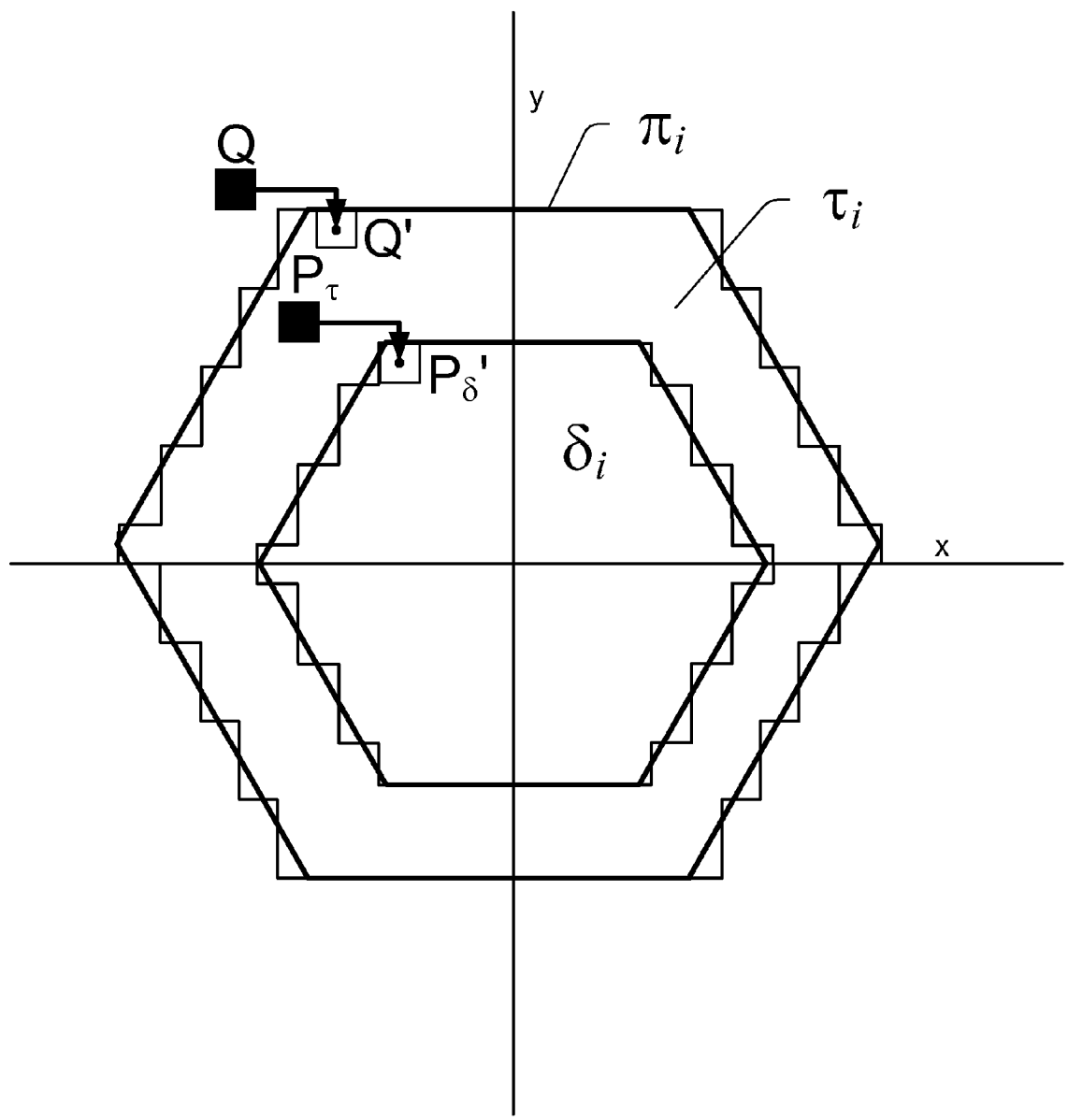
FIG. 13 is a diagram illustrating an exemplary polygon having a core region and a tolerance region wherein a selected pixel lies outside of the polygon boundary.

As already mentioned, an exemplary password system optionally uses an offset (e.g., determined in a password selection or creation process) during a logon process. Referring to FIG. 13, an exemplary logon scenario is shown for a particular one of the password polygons. This scenario accounts for a user that, at logon, selects a pixel (group of pixels, etc.) that lies outside the polygon, for example, by a distance. To allow some degree of flexibility, the logon process applies a "logon tolerance". The logon tolerance is optionally the same as the aforementioned tolerance ∈, discussed above (or below), or optionally an offset determined in a password selection or creation process. For example, if at password selection or creation, the user selected a pixel $P_\tau$ having a position in a tolerance region $\tau$, then, according to an aforementioned exemplary password system, the pixel $P_\tau$ was transformed or offset to a position in the core region $\delta$. This same transform or offset (or an offset selected from a set of offsets) is optionally used directly (direction, magnitude) or indirectly (magnitude) as a "logon tolerance" to transform or offset a user selected pixel that lies a distance outside the polygon to a position in the polygon. Of course, other tolerances are also possible, such as, but not limited to, a tolerance determined and/or set in an image analysis process and/or in a tiling process.

As shown in FIG. 13, at the time of an exemplary password selection or creation, a user selected a pixel P in polygon $\pi_i$ having a position in the tolerance region $\tau_i$ (e.g., $\|P_\tau - P_\delta'\| \leq \in$), which was optionally transformed or offset to a position in $\delta_i$ and then labeled $P_i$. According to this scenario, the exemplary password system then determines a transform or offset (e.g., $\psi_2(P_i)$) capable of re-positioning the pixel $P_\tau$ to a position $P_\delta'$ in the core region $\delta_i$. If at logon, the user selects a pixel Q, which lies outside of the polygon $\pi_i$, then the exemplary system will, using the transform or offset, re-position the pixel Q to a position Q' which may lie within the polygon $\pi_i$ (e.g., $Q'=Q+\psi_2(P_i)$). If the position Q' lies within the polygon $\pi_i$, then the exemplary system will assume that the user selected polygon $\pi_i$.

Such an exemplary logon transform may also be explained in other terms. For example, the transform or offset may be considered to realign the grid. If a transform or offset is used to realign a polygon grid such that each selected pixel, at time of password selection or creation, is located in the center region of the containing polygon. For instance, if pixel P is originally selected in the tolerance region $\tau_i$ of polygon $\pi_i$, then a transform or offset of x pixels and y pixels may realign pixel P to pixel P' wherein P' lies in a core region $\delta_i$. If at logon, the user enters pixel Q wherein the position of Q lies within a Euclidean distance or tolerance $\in_{logon}=(x^2+y^2)^{0.5}$ from the polygon $\pi_i$, then this error may be tolerated. Thus, if Q can be transformed to Q', using a "logon tolerance" transform or offset (e.g., $Q'=Q+\psi_2(P_i)$, $Q'=Q+\in_{log\ on}$, $Q'=Q+\in$, $Q'=Q+\in_i$, etc.), then the error is tolerated. Note that the exemplary logon tolerance transform or offset optionally depends on the component $\psi_2(P_i)$, thus, in such circumstances, no additional information is needed (i.e., the logon transform or offset and password selection or creation transform or offset are essentially the same or both members of the same set). Of course, other transforms or offsets are possible, for example, a transform or offset may be limited to x pixels and y pixels, etc.

Using such a logon tolerance, logon is allowed when, for example, the hash of the logon password $D_p$ checks favorably with the hash of the stored password $C_p$. This process is optionally represented by the following equation:

$$\psi_1(C_p) \equiv CSH\left(\sum_{i=1}^{p}[L^{i-1} \cdot (j \mid (Q_i + \{a_i, b_i\}) \in \pi_j)]\right)$$

wherein $\{a_i, b_i\}$ corresponds to the i-th offset pair in $\psi_2$ and $P(x, y)+\{a, b\}$ equals $P(x+a, y+b)$.

Security Metrics

Once constructed, an image grid creates a certain password space with respect to the content of the image and, for example, the potential offsets. In general, grid metrics impact security of the system, especially as related to brute-force attacks. Naive computation of the password space would raise the number of polygons to the power of the number of pixels in a password. However, it is typically unlikely that an image can provide sufficient visual diversity, such that each polygon in a grid of regular polygons is selected with equal probability. In addition, the security of the system should account for the fact that the grid structure and grid offsets may be obtained by the adversary (for example, by obtaining the system passwd file). Therefore, to provide insight on the security of various aforementioned exemplary password systems, the notion of entropy is introduced in relation to polygon selection. Under the notion of entropy, a grid of L polygons in space Π that results in maximum entropy, may be an objective of grid design.

Grid design may also consider subjective and/or objective likelihood or probability that a pixel or polygon is selected by a user as part of a password. For pixel probability, an exemplary system may generate a map having weights assigned to each pixel. For example, for a rectangular image having m pixels by n pixels in an x, y coordinate system, a weight w(x, y) associated with a pixel P(x, y) corresponds to the probability that the pixel is selected by a user during password selection or creation. Of course, for an image I may be divided into L polygons on the basis of pixel weighting or a pixel weight map. Further, an image I may be divided into L polygons wherein a polygon probability map is optionally developed subsequently.

Given a pixel probability map, an image I and a grid of L polygons, where $\Pi(I)=\{\pi_i|i=1 \ldots L\}$, the entropy H of selecting a polygon equals:

$$H(\Pi) = -\sum_{\forall\{a,b\}\in\Psi}\sum_{i=1}^{L}\vartheta(\{a, b\}, \pi_i) \cdot \log_2(\vartheta(\{a, b\}, \pi_i))$$

where $\Psi$ is the set of all possible offset combinations in the grid structure and $\theta(\{a,b\},\pi_i)$ denotes the probability that a pixel from polygon $\pi_i$ is selected with an offset $\{a, b\}$ and equals:

$$\vartheta(\{a, b\}, \pi_i) = \sum_{\forall P_j \in \pi_i | P_j + \{a,b\} \in \delta_i} w(P_j)$$

A general assumption for assessing an attack on various exemplary password systems optionally includes a system file with the corresponding entries $\psi_0, \psi_1, \psi_2$ available to the adversary as well as the image I, a corresponding probability weight map W, and a resulting grid Π. The latter assumption is valid if algorithms used for image analysis and grid design are publicly available and/or otherwise accessible with little effort; however, according to various exemplary systems described herein, generalities and/or specifics of image analysis and/or grid design are optionally proprietary and/or secured by any of a variety of security measures.

In this hypothetical example, to find the list of polygons that constitutes a given password $C_p$, the adversary may launch the following brute force attack. In a first step, for each pixel $P_i \in C_p$, the adversary computes the subset of polygons $\Omega(P_i) \subseteq \Pi$ of minimal cardinality such that for the corresponding offset $\psi_2(P_i)$, $$\sum_{\forall \pi_j \in \Omega(P_i)} \vartheta(\psi_2(P_i), \pi_j) < \varepsilon_{pm} \cdot \sum_{\forall \pi_j \in \Pi} \vartheta(\psi_2(P_i), \pi_j)$$

In this case, $\in_{pm}$ is a parameter that balances computational complexity and likelihood of success, typically, $\in_{pm} > 0.9$.

In a second step, the adversary generates the set of attack vectors as all possible p-long combinations of polygons $C_A = \{\pi_{A1} \ldots \pi_{Ap}\}$, where each variable $\pi_{Ai}$ takes the values of all polygons in the corresponding $\Omega(P_i)$. For each attack vector $C_a \in C_A$, the adversary computes $\psi_1(C_a)$ until it matches $\psi_1(C_p)$ retrieved from the password file. The cardinality of the set of attack vectors $C_A$ equals:

$$|C_A| = \prod_{\forall P_i \in C_p} |\Omega(P_i)|$$

In order to minimize the expected length of the search, the adversary tests test vectors from $C_A$ with decreasing probability of occurrence.

In a sense, this attack resembles the "dictionary attack" for textual passwords because it identifies a subset of most likely password symbols and exhaustively tests all passwords from this subset against the stored $\psi_1$. Under the assumption that the weight map W used by the adversary is accurate, the likelihood of success for this attack is strongly governed by the cut-off threshold $\in_{pm}$ and equals $\Pr[C_p \in C_A] = 1 - \in_{pm}^P$.

Exemplary Grid and/or Tiling Processes

Described herein are various exemplary methods for making a grid or tiling an image with polygons or other shapes such that the entropy of tile selection during password entry is maximized for a given tolerance $\in$ of, for example, pixel selection. According to such exemplary methods, grids are optionally constructed from a single shape polygon, multiple polygon shapes, and/or using Voronoi polygons. In addition, tiling optionally occurs in conjunction with image segmentation and/or weighting, for example, but not limited to, probability weighting of image pixels.

From the aforementioned entropy equation $H(\Pi)$, maximal entropy is achieved for a set $\Pi$ of L polygons if:

$(\forall \{a,b\} \in \Psi)(\forall \pi \in \Pi)\theta(\{a,b\},\pi) = const. > 0$ In general, this case can occur only if $(\forall P \in I)w(P) = const. > 0$. However, it is relatively unlikely that any image can provide visual diversity such that the human eye can, with equiprobability, select any pixel as a password pixel. Hence, certain variance in the probability $\theta(\{a,b\},\pi)$ that polygon $\pi$ has been selected with an offset $\{a, b\}$ must exist with respect to distinct polygons and offset values. For the sake of brevity and simplicity, consider the following model for the image weight map W. According to this exemplary model, each pixel weight takes randomly one of the two values:

$$w(P) = 0, \Pr[w(P) = 0] = 1 - \frac{1}{mn\mu} \text{ or } 1, \Pr[w(P) = \mu] = \frac{1}{mn\mu}$$

where $0 < \mu \leq 1$ (typically for images $0 < \mu \leq 0.05$) and m and n are image dimensions for a rectangular image in pixels (groups of pixels, etc.). In addition, pixels having $w(P) = \mu$ may be considered "clickable" (or otherwise selectable).

Figure 14:
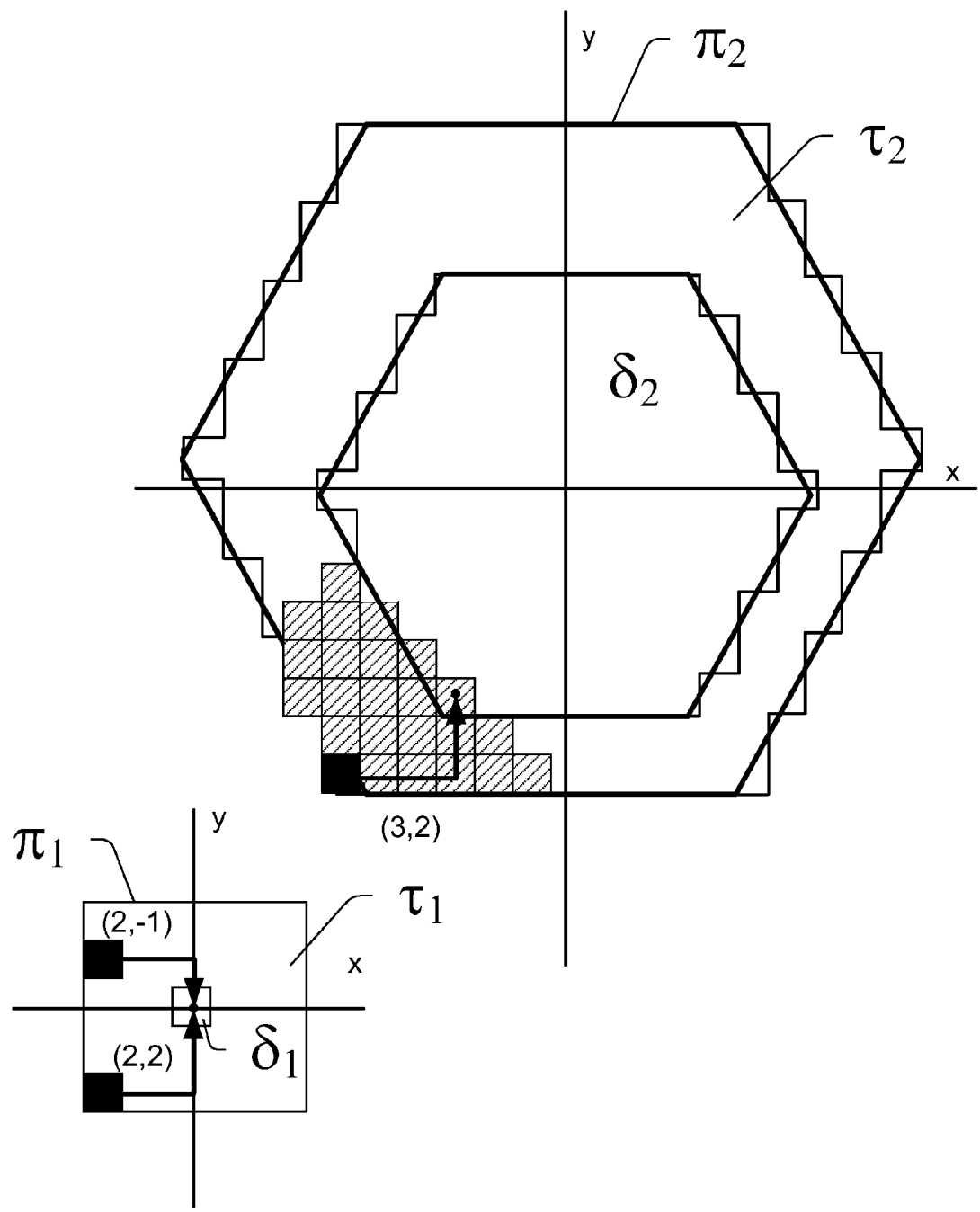
FIG. 14 is a diagram illustrating two exemplary polygons, each polygon having a core region and a tolerance region wherein a transform or offset is applied to various select pixels.

To illustrate some potential differences stemming from polygon size and/or shape, FIG. 14 shows two exemplary polygons $\pi_1$ and $\pi_2$. Note that only a single pixel represents the central region $\delta_1$ of $\pi_1$. Hence, one of 25 distinct transform or offset values $\{a, b\} \in \Psi$ is used to realign every pixel the tolerance region $\tau_1$ of $\tau_1$ to the sole core region pixel in $\delta_1$. For a tiling composed of a plurality of such polygons (e.g., $\pi_1$), any single recorded offset points to a single pixel in each polygon. In this exemplary scenario, one advantage of tiling an image with polygons similar to $\pi_1$ is that there may be more polygons due to their relatively small size. However, this comes at the expense of having a smaller ratio of polygons with a "clickable" pixel for a given offset value.

On the other hand, FIG. 14 also depicts a subset of pixels (shaded region) that belongs to polygon $\pi_2$, where each pixel in the subset can be transformed or offset with an offset of $\{3, 2\}$. Roughly, for any offset in $\Psi$, the cardinality of this subset equals approximately $|\delta_2|$. The likelihood that this subset contains a "clickable" point is substantially greater than in the case of $\pi_1$. This characteristic comes at the expense of increased polygon size which typically results in fewer polygons used in order to tile an image.

This particular tradeoff may be further evaluated as for an image tiled with a single shape polygon (e.g., square, hexagon, etc.). The following analysis is based on several assumptions. First, the image plane is significantly larger than polygon area $m \times n \gg A(\pi)$, where $\pi$ is the tiling polygon and the function $A(\pi)$ returns the area of $\pi$ in pixels. Second, "clickable" points are relatively infrequent, i.e., $\mu^{-1} < |\delta|$, and randomly dispersed throughout the image. Third, for relatively large polygons (e.g., $|\pi| > 30$ pixels), "edge effects" are neglected, where "edge effects" refer to pixilated edges of polygons (which if taken into account would increase the number of sides of a polygon). Fourth, the cardinality of an offset region of a polygon equals the cardinality of a polygon's core region, where an offset region of a polygon is defined as follows. For a given polygon $\pi$ with an associated core region $\delta$, its offset region, denoted as $\sigma(\{a,b\})$, is optionally defined as a subset of pixels in $\pi$, such that for each pixel $P \in \sigma(\{a,b\})$, $P + \{a, b\} \in \delta$. Note that in general $|\sigma(\{a,b\})| \leq |\delta|$, for example, in FIG. 14, $\sigma_2(\{3,2\}) = |\delta_2| - 1$.

A theorem for optimal polygon size for maximum entropy tiling follows. For a given image I of $m \times n$ pixels, a tolerance of $\in$, and a weight map W (modeled per the aforementioned equation with a uniform probability $\mu$ that a pixel is selected as a password pixel), the optimal size of a polygon of fixed shape that results in a maximized $H(\Pi)$ (per aforementioned equation for $H(\Pi)$), is the one that results in a maximum number of polygons that contain at least one "clickable" pixel and is approximately determined as the maximum of the following function:

$$\xi(\pi) \approx \frac{mn}{A(\pi)}\left[1 - \left(1 - \frac{1}{mn\mu}\right)^{A(\delta)}\right]$$

with respect to polygon size $A(\pi)$ and related size of its core region $A(\delta)$ which is uniquely determined based on a given $\pi$ and $\in$ as $\in$ is optionally defined above.

The aforementioned theorem is suitable, for example, for determining the optimal square polygon size for a given click password system. For a click tolerance of at least $\in$ pixels (e.g., $\in$ defined as number of pixel wherein, for example, each pixel has x=1 and y=1) and a core region square with an edge of a pixels, the resulting edge length of the tiling polygon equals a+∈ pixels. From the aforementioned equation for ξ(π), the following equation may be derived:

$$\xi(a) = \left\lfloor \frac{m}{a+2\varepsilon} \right\rfloor \left\lfloor \frac{n}{a+2\varepsilon} \right\rfloor \left(1 - \left(1 - \frac{1}{mn\mu}\right)^{a^2}\right)$$

Typically, finding a, which results in a maximum value for this function, is solvable using standard numerical methods.

According to an exemplary system and/or method, a polygon shape that optionally maximizes the number of polygons with respect to a fixed perimeter of the polygon is a hexagon. The size of a uniform tiling hexagon for a given click password system (e.g., having image-specific parameters m, n, ∈, and μ) is optionally derived using the aforementioned theorem.

Voronoi Polygon Grid and/or Tiling

An exemplary method for defining a Voronoi polygon grid and/or tiling includes assigning various pixels to various polygons. According to this exemplary method, a suitable image is representable to a user as a set of pixels, for example, on a display. Further, as already mentioned, for any polygon, here including Voronoi polygons, π optionally has an associated core region δ wherein its offset region is optionally defined as a subset of pixels in π, such that for each pixel P∈σ({a,b}),P+{a,b}∈δ. Yet further, for any given chosen pixel Q, a distance is determinable between a pixel P and Q.

More formally, in an exemplary method for defining a Voronoi polygon grid, a given image I has a Voronoi grid of L polygons (e.g., Π(I)={π_i,i=1 . . . L} ⊂ I,P_i→π_i) such that a given pixel Q∈I belongs to the polygon π_j∈Π, if and only if the polygon's defining pixel P_j has the shortest Euclidean distance from Q with respect to all other pixels in Γ. In this exemplary method, if there are several pixels in Γ that share the same shortest distance from Q, the pixels are sorted in any of a variety of manner, for example, in the decreasing order of their x-ordinates and y-abscissas respectively (e.g., for a Cartesian coordinate system), and, for example, the top-sorted pixel is selected. According to such an exemplary Voronoi grid, the grid is fully defined using the subset of pixels Γ. Further, for a given tolerance (e.g., ∈), a central region for each polygon π_i, is optionally definable by (∀P∈δ_i)(∀Q∉π_i) ‖P-Q‖>∈, as already described above.

Through use of such an exemplary method for tiling, it is optionally possible to create a Voronoi grid such that the entropy of polygon selection is effectively maximized. An exemplary heuristic solution uses a constructive algorithm that tiles an image using a "1-lookahead greedy" strategy. In general, polygon selection entropy is maximized if the cardinality L of the polygon set Γ is maximized while within each polygon the minimal likelihood of occurrence of any offset from Ψ is non-zero (see, e.g., above equations for Ψ, ψ_1). Hence, for such a polygon grid and for a given offset, an adversary needs to consider all polygons in Π in its brute force attack. Such an approximation of the original optimization goal is typically effective mainly because of two facts: (1) "clickable" islands of pixels have relatively large mutual distances as the nature of human perception requires isolated graphical features (corners, dots, symbols, etc.) to select them, and (2) there are not more than a few "clickable" pixels per polygon, as an intention to keep the polygon size as small as possible is often desirable.

Defining a grid according to such an approximation can result in a relatively small variance in the likelihood that a certain polygon is selected given a certain offset across all polygons in the grid. In general, quality of a grid or solution Π is optionally verifiable via computation of a corresponding security metric (e.g., H(Π), as defined above). Finally, an optimization objective is optionally generalized such that L is maximized under the condition that within each polygon ρ·|Ψ| of offsets from Ψ have a non-zero likelihood of selection. For the sake of brevity, as described herein, an exemplary method uses the constraint ρ=1.

An exemplary method for tiling includes two maps: a binary coverage map $M_C = \{0, 1\}^{m \times n}$ where each element $M_C(x, y)$ denotes that pixel P(x, y)∈I has been covered during polygon tiling, and an integer polygon-size map $M_P = \{Z\}^{m \times n}$, where each element $M_P(x, y)$ equals the minimal radius of a pixel-rasterized circle centered at P(x, y) which has a non-zero likelihood occurrence of any offset in Ψ wherein the radius of the circle is at least ∈+1 pixels.

The value of each element in $M_P$ is optionally computed using exhaustive search formally described using, for example, the following exemplary pseudo-code for determining a size map $M_P$ (e.g., MP):

```
radius = ε + 1
while radius ≤ 2ε
    polygon π is a circle centered at P(x, y) with radius
    done = true
    for each offset {a, b} ∈ Ψ
        if there are no "clickable" pixels in σ_π({a, b})
            done = false; break
    end for
    if done then MP(P(x, y)) = radius; return
    radius++
end while
return MP(P(x, y)) = ∞
```

For a given "click" tolerance ∈ and a given pixel P(x,y), its value $M_P(x, y)$ is optionally computed in the following manner. In the starting iteration, a polygon π of circular shape centered at P(x, y) with radius ∈+1 is created. If for all possible offsets in Ψ, their offset-regions contain at least one "clickable" pixel, then π is accepted as the resulting polygon and $M_P(x, y)$ is set to the value of polygon's radius. In subsequent iterations, the radius of polygon π is increased until 2∈. If a polygon with satisfactory characteristics is not found, then $M_P(x, y)$=∞. Polygons larger than this maximal size are never selected explicitly during the tiling procedure, because a polygon with radius 2∈ and a "clickable" pixel at P(x, y), is generally guaranteed to contain at least one "clickable" pixel for each possible offset-region. Once all polygons are selected, the respective polygon borders are optionally recomputed according the aforementioned exemplary formal method for defining a Voronoi polygon grid. In addition, various borders may exceed a maximal area of a polygon, a condition that is optionally handled in a subsequent procedure.

An exemplary Voronoi tiling method optionally aims to find a max-cardinality subset Γ of pixels in I such that all polygons defined within Γ have non-zero likelihood of occurrence for any offset in Ψ. The resulting max-cardinality problem is NP-complete as it is mapable to a SET PACKING problem (see, e.g., Garey and Johnson, *Computers and Intractability*, Freeman, 1979). For example, for each pixel P(x, y), a set is created that encompasses all neighboring pixels covered by a polygon π centered at P and with radius $M_P(P)$. This particular problem has a domain composed of a collection of such sets for all pixels P with a finite value of their corresponding polygon-size map $M_P(P)=\infty$. In addition, this particular problem has an optimization goal finding the selection of mutually disjoint sets from the collection having maximal cardinality.

According to an exemplary method, Voronoi tiling is optionally performed as outlined by the following exemplary pseudo-code:

```
MC = 0; compute MP; set result Γ = Ø
repeat
  compute set Λ ⊂ I of pixels such that
    Λ = {P(x, y) ∈ I | MC(P) = 0 ∧ MP(P) = ∞}
  if Λ = Ø break
  find λ ⊂ Λ such that
    (∀ P ∈ λ, ∀ Q ∈ Λ – λ) (MP (P)<MP (Q)) ∧ (g(P) > g(Q))
  randomly select a point P from λ
  Γ = Γ ∪ P
  for each Q(x, y) ∈ I
    if ||Q – P|| ≤ MP (P) + MP(Q)
    set MC(Q) = 1
    end for
end repeat
```

In an initialization procedure, the coverage map $M_C$ (e.g., MC) is initialized to zero, the size map $M_P$ (e.g., MP) is computed, for example, as described above (see exemplary code for a size map), and a resulting set Γ is initiated to an empty set. A solution is typically determined or "built" in a sequence of constructive iterations. In such a constructive sequence, each iteration includes computing a set Λ of all points which are not covered and having finite polygon-size map values. Per iteration, a single pixel P(x, y) is added to a final solution wherein the added pixel generally has the following properties: (1) it belongs to the set λ1 ⊂ Λ, where each pixel Q ∈ λ1 has a smaller or equal polygon-size value with respect to all other pixels in Λ; and (2) it has the largest value among all pixels in λ1 for the following objective function:

$$g(P) = \begin{cases} \infty, & M_C(P) = 1 \\ [|\theta_2(P)|/\eta(P)] - |\theta_1(P)|, & M_C(P) = 0 \end{cases}$$

Sets $\theta_1(P)$ and $\theta_2(P)$ are creatable as a collection of "clickable" pixels in a circular polygon centered at P with radius $M_P(P)+\in+1$ and a collection of yet uncovered "clickable" pixels in the ring of pixels centered at P and with an outer radius $M_P(P)+2\in$ and an inner radius $M_P(P)+F+1$, respectively. More formally, sets $\theta_1(P)$ and $\theta_2(P)$ are optionally definable as follows:

$\theta_1(P) = \{Q \in I | w(Q) > 0 \ \wedge ||Q-P|| \leq M_P(P)+\in+1\}$ $\theta_2(P) = \{Q \in I | M_C(Q) = 0 \ \wedge w(Q) > 0 \ \wedge M_P(P)+\in+1 < ||Q-P|| \leq M_P(P)+2\in\}$ The scaler ratio $\eta(P)$, as used above in g(P), quantifies the ratio of covered versus total pixels in the above mentioned ring of pixels. The function g(P) aims to heuristically direct a search by enforcing intermediate solutions that have, for example, the following properties:

(1) "Least constraining"—a small number of "clickable" pixels in a circular polygon centered at P with radius $M_P(P)+\in+1$. With this property, by covering as few as possible "clickable" pixels with the selection of each Voronoi polygon, part of the image not yet covered with polygons has as many as possible "clickable" pixels. In general, this property improves the likelihood for obtaining a better solution; and (2) "1-lookahead most constrained"—the neighborhood of each selected polygon, i.e., the ring of pixels Q at distance $M_P(P)+\in+1 < ||Q-P|| \leq M_P(P)+2\in$ from P, proportional to its cardinality, should have as many as possible "clickable" pixels. This property improves the likelihood that a search algorithm finds a better solution in the neighborhood of a current polygon.

According to an exemplary method, after selection of a pixel P(x, y), all pixels Q(x, y) ∈ I at Euclidean distance $||Q-P|| \leq M_P(P)+M_P(Q)$ are generally marked as covered $M_C(Q)=1$. According to an exemplary method, one or more constructive iterations follow until all "clickable" pixels are covered or an additional polygon of minimal area cannot be added to the set Γ. An aggregated collection of pixels (e.g., pixels in the set Γ), optionally defines a resulting Voronoi polygon tiling, for example, according to the aforementioned formal exemplary method for defining a Voronoi polygon grid.

As described above, an exemplary method for Voronoi polygon tiling that aims to maximize entropy of polygon selection is optionally a SET PACKING problem (e.g., an optimization task known to be NP-complete). As described above, an exemplary method for generating a solution to such a problem optionally includes a constructive heuristic with complexity linearly proportional to the number of "clickable" pixels in a considered image.

Various exemplary methods for griding and/or tiling optionally include probabilistic iterative improvement post-processing and/or simulated annealing (see, e.g., Cormen, et al., *Introduction to algorithms*, MIT Press, 1990). In addition, an exemplary password system stores a Voronoi tiling on a computer system and/or recomputes a Voronoi tiling before each login.

In general, a well-recognized limitation of text-based passwords is the stringent set of alphabet symbols that are commonly used to construct typically memorizable passwords. In response to such password systems, adversaries have created numerous programs that can typically break more than one quarter of all passwords in a system using a simple "dictionary attack". According to various exemplary methods, contents of an image are partitioned as a polygon tiling where each polygon represents a password symbol and typically a distinct password symbol. For example, according to an exemplary method, by clicking on a particular pixel, a user selects a symbol represented by a containing polygon. Further, an exemplary method optionally provides a limited tolerance to inaccuracy during pixel selection at logon. Analysis and/or assessment of various exemplary image-based password systems optionally involves computing a security metric such as, but not limited to, the entropy of polygon selection. In addition, such a security metric (e.g., an entropy, etc.) is optionally used in tiling, for example, wherein a metric is maximized, minimized, etc. to achieve a desirable result. Yet further, an exemplary method optionally assigns weights and/or probabilities to various pixels, groups of pixels, objects, etc. (e.g., a weight associated with the likelihood that a certain pixel will be selected as a password component). Such an exemplary method optionally produces a map wherein the map is useful in analysis, tiling and/or other assessment of an exemplary password system.

Various Exemplary Methods

Figure 15:
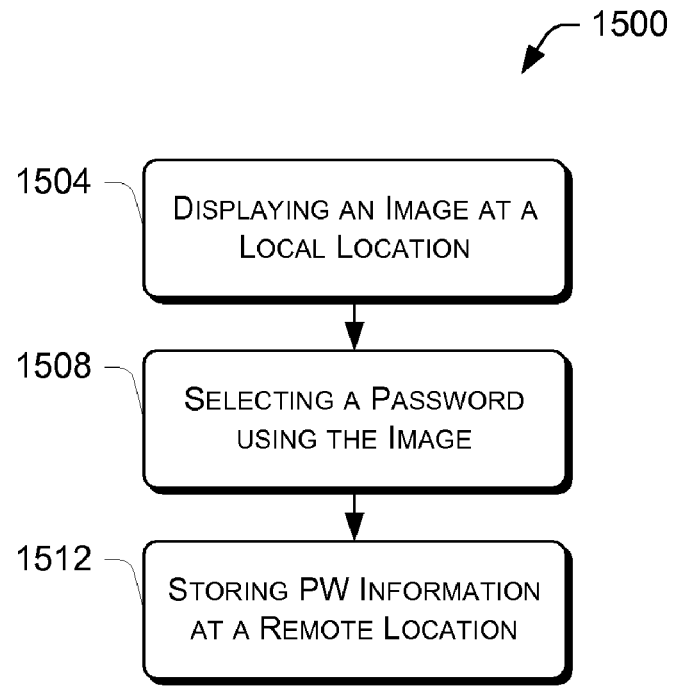
FIG. 15 is a block diagram of an exemplary method for displaying an image locally and storing password information remotely.

Various exemplary password methods described herein may incorporate one or more aspects of the exemplary password systems described above. For example, referring to FIG. 15, an exemplary method 1500 for storing password information is shown. In a display block 1504, a computer, computing device, or display device displays an image at a local location. In a selection block 1508, a user selects a password using the image and thereby generates password information. For example, a user may use a pointing device (finger, mouse, etc.) to select one or more regions of the image. As described above, each region optionally corresponds to a pixel, groups of pixel, a polygon (or other shaped region), etc. Next, in a storage block 1512, password information is stored at a remote location. According to the exemplary method 1500, however, the password information does not include the image. Hence, the image is displayed and/or stored locally while password information corresponding to a user selected password is stored remotely. Such an exemplary method is suitable for logon to a remote computer from a local computer, computing device, display device, etc.

Figure 16:
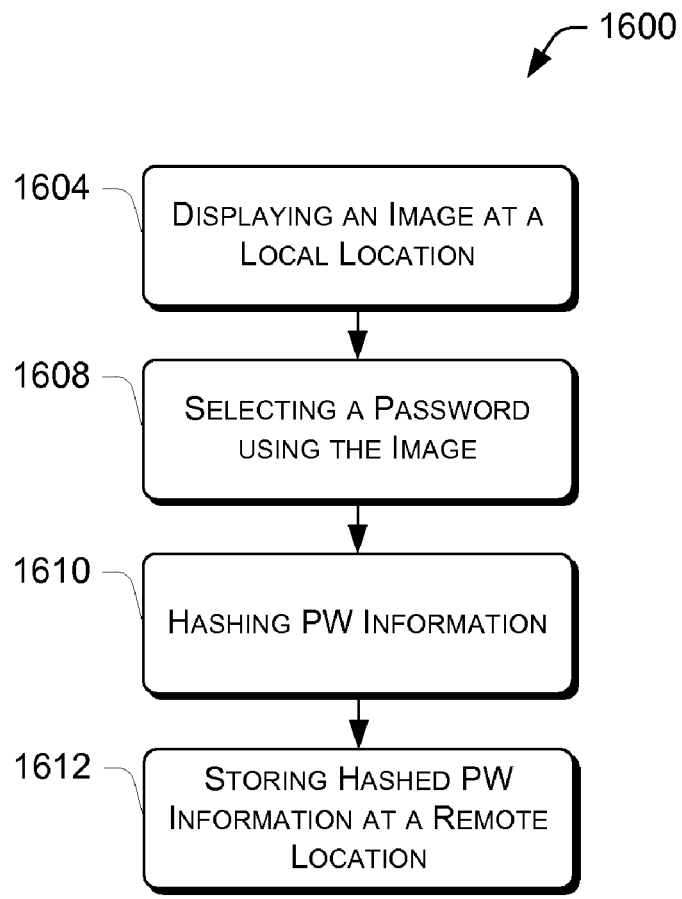
FIG. 16 is a block diagram of an exemplary method for hashing password information and storing the hashed password information.

Referring to FIG. 16, another exemplary method 1600 for storing password information is shown. In a display block 1604, a computer, computing device, or display device displays an image at a local location. In a selection block 1608, a user selects a password using the image and thereby generates password information. For example, a user may use a pointing device (finger, mouse, etc.) to select one or more regions of the image. As described above, each region optionally corresponds to a pixel, groups of pixel, a polygon (or other shaped region), etc. Next, in a hash block 1610, a computer or computing device hashes at least part of the password information using a hash operation (e.g., hash function, etc.) to generated hashed password information. After the hash block 1610, in a storage block 1612, at least the hashed password information is stored at a remote location. According to the exemplary method 1600, the image is displayed and/or stored locally while hashed password information corresponding to a user selected password is stored remotely. Such an exemplary method is suitable for logon to a remote computer from a local computer, computing device, display device, etc.

Figure 17:
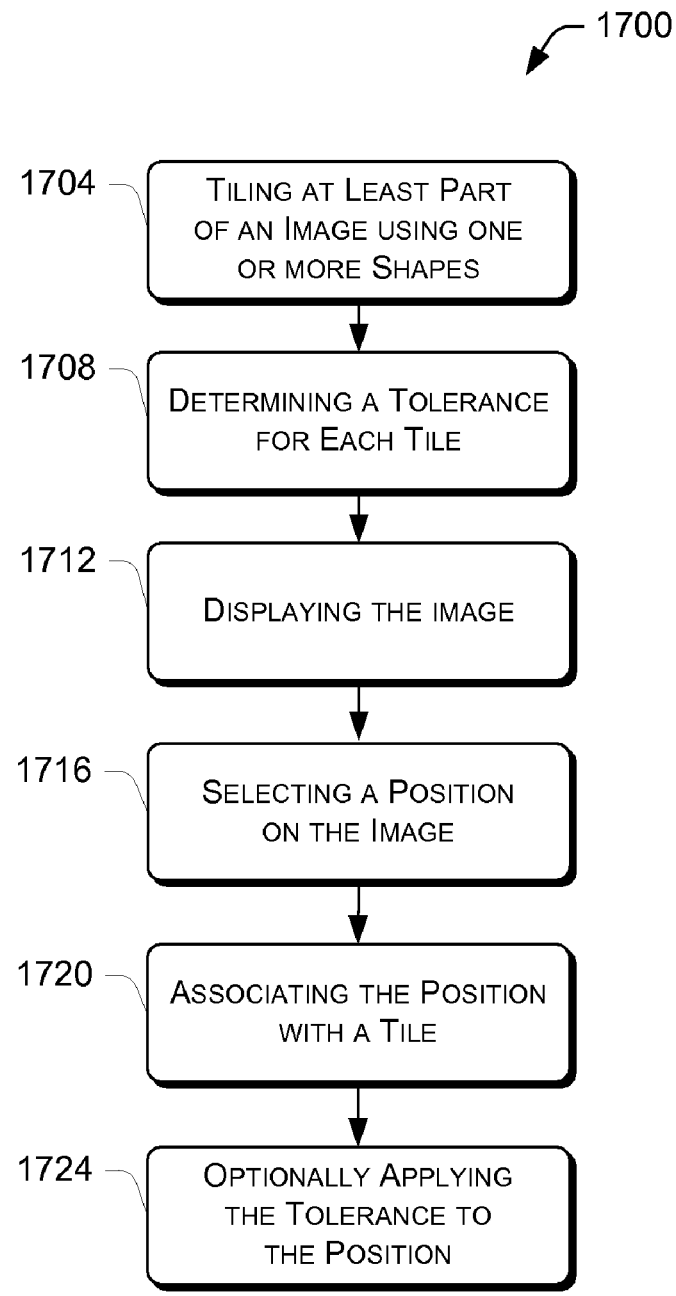
FIG. 17 is a block diagram of an exemplary method for optionally applying a tolerance to a selected position on an image.

Referring to FIG. 17, an exemplary method 1700 for using one or more tolerances in a password system is shown. In a tiling block 1704, at least part of an image is tiled using tiles having one or more shapes. For example, the one or more shapes are optionally polygons, such as, but not limited to, hexagons, tetragons, triangles, etc. Further, a single shape is optionally suitable wherein the single shape has a uniform size or varying sizes. In a determination block 1708, a tolerance is determined for each of tiles. A variety of manners exist for determining a tolerance. For example, a tolerance is optionally assigned, determined mathematically, or directly or indirectly through user input during password selection. Next, in a display block 1712, the image is displayed to a user. In general, the displayed image does not visibly show the tiles. However, at the time of password selection, a particular exemplary method may optionally display one or more of the tiles and/or other information associated with the tiling. In such a particular method, such tile or other information is generally not displayed at subsequent times (e.g., at subsequent logon times not associated with password selection).

In a selection block 1716, the user selects a position on the displayed image. Following the selection (or optionally a series of selections, etc.), an association block 1720 associates the position with a tile and/or the tolerance of the tile. Next, in an application block 1724, the tolerance is optionally applied to the position to determined, for example, if the position should be designated as belonging to the tile. In the exemplary method 1700, the tolerance is optionally an offset or a transform and/or optionally used to determine one or more offsets or one or more transforms.

Figure 18:
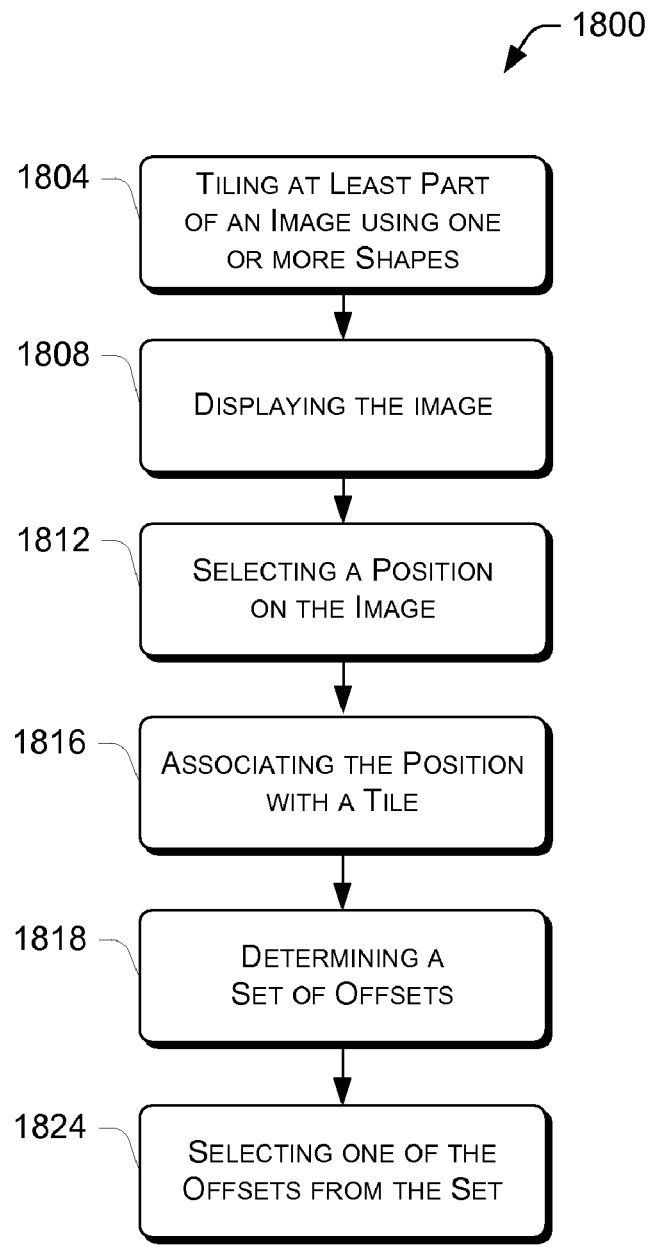
FIG. 18 is a block diagram of an exemplary method for determining a set of offsets or transforms.

Referring to FIG. 18, an exemplary method 1800 for use in a password system involving selecting an offset from a set of offsets is shown. In a tiling block 1804, at least part of an image is tiled using tiles having one or more shapes. For example, the one or more shapes are optionally polygons, such as, but not limited to, hexagons, tetragons, triangles, etc. Further, a single shape is optionally suitable wherein the single shape has a uniform size or varying sizes. In a display block 1808, the image is displayed to a user. In general, the displayed image does not visibly show the tiles. However, at the time of password selection, a particular exemplary method may optionally display one or more of the tiles and/or other information associated with the tiling. In such a particular method, such tile or other information is generally not displayed at subsequent times (e.g., at subsequent logon times not associated with password selection).

In a selection block 1812, the user selects a position on the displayed image. Following the selection, an association block 1816 associates the selected position with a tile. Next, in a determination block 1820, the exemplary method 1800 determines a set of offsets (or transforms) composed of offsets that can re-position (or move) the selected position to other positions within the bounds of the tile. Thereafter, in another selection block 1824, one of the offsets in the set of offsets is selected. In general, the selected offset is selected randomly from the set of offsets (e.g., using a random function or pseudo-random function).

Figure 19:
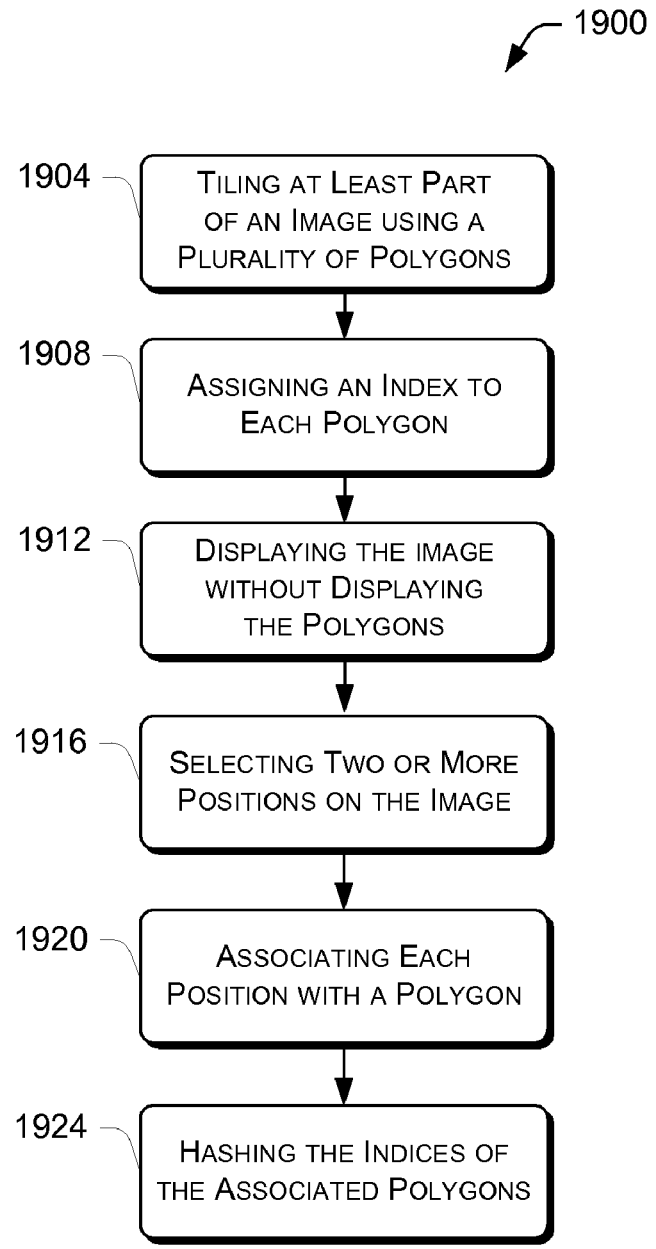
FIG. 19 is a block diagram of an exemplary method for hashing indices of two or more selected polygons.

Referring to FIG. 19, an exemplary method 1900 for use in a password system that involves hashing indices associated with polygons is shown. In a tiling block 1904, at least part of an image is tiled using a plurality of polygons. For example, the polygons optionally include hexagons, tetragons, triangles, etc. Further, a single type of polygon is optionally suitable wherein the single type has a uniform size or varying sizes. In an assignment block 1908, an index is assigned to each polygon. Of course, as described above, optionally, only certain polygons are assigned an index. In a display block 1912, the image is displayed to a user without displaying the polygons. According to such a display block, a casual observer cannot easily discern positioning, size, etc. of the polygons by observing the displayed image. Next, in a selection block 1916, a user selects two or more positions on the image. In an association block 1920, each position is associated with a polygon, wherein each polygon has an assigned index. Then, in a hash block 1924, the indices of the associated polygons are hashed.

Figure 20:
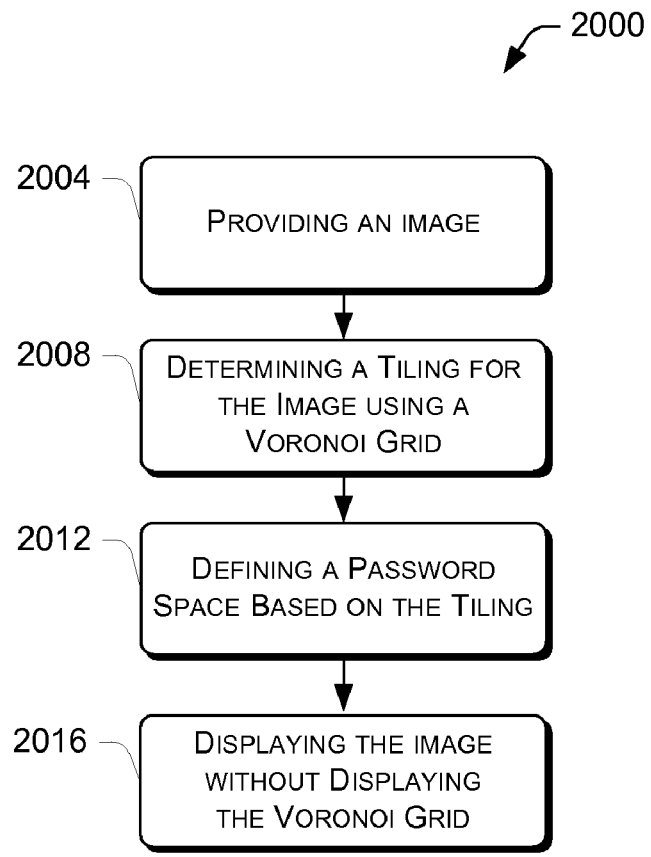
FIG. 20 is a block diagram of an exemplary method for defining a password space.

Referring to FIG. 20, an exemplary method 2000 for defining a password space is shown. In a providing block 2004, an image is provided, for example, an image having a variety of features as described above. Next, a determination block 2008 involves determining a tiling for the image using a Voronoi grid, for example, as described above. A definition block 2012 follows wherein a password space is defined based on the tiling. A display block 2016 then displays the image without displaying the Voronoi grid. In this exemplary method, the determining a tiling optionally occurs at a remote location (e.g., at a server) and the displaying optionally occurs locally (e.g., at a client). Alternatively, the determining a tiling and displaying optionally occur locally. Further, in this exemplary method, the defining optionally occurs at a remote location (e.g., at a server) and the displaying optionally occurs locally (e.g., at a client). Alternatively, the defining and displaying optionally occur locally. Of course, a variety of local and/or remote combinations are possible for execution of the functional blocks 2004-2016. In addition, rather than displaying, the exemplary method 2000 optionally stores the image and makes it available upon request, for example, but not limited to, a request from a client (e.g., a client seeking to initiate a secure transaction, etc.).

In such an exemplary method (e.g., method 2000), image analysis optionally occurs prior to the determining a tiling. For example, image analysis optionally includes segmentation and/or weighting, such as, but not limited to, probability weighting. Image analysis optionally assists the determining a tiling and/or the defining. Further, the determining optionally uses entropy as a factor, for example, but not limited to, wherein the determining maximizes an entropy based on an entropy function, such as, but not limited to, above described entropy functions.

Figure 21:
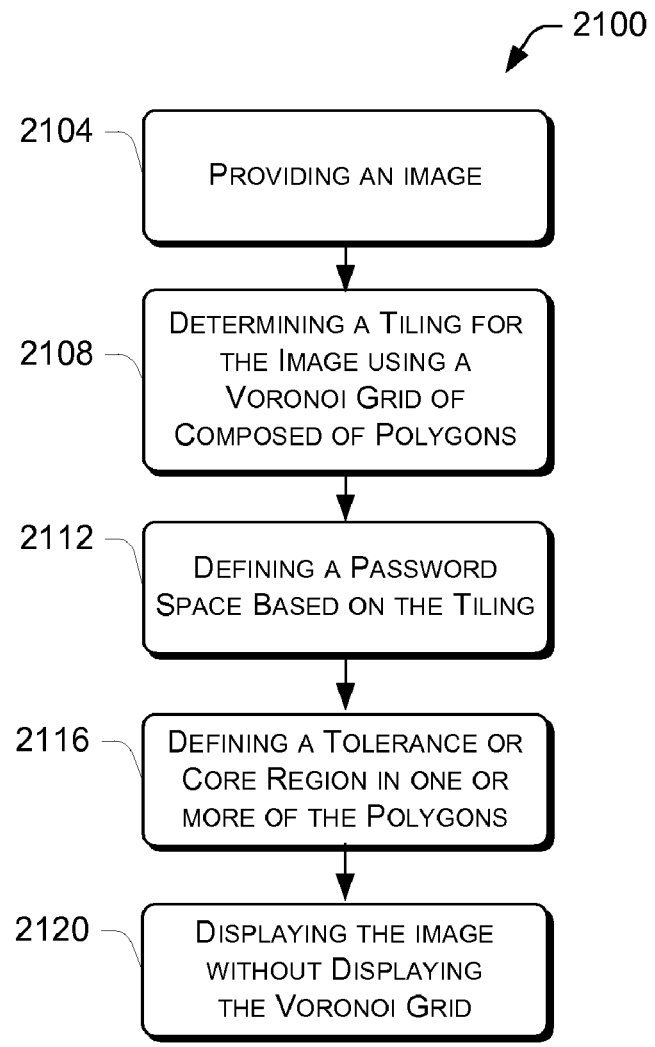
FIG. 21 is a block diagram of an exemplary method for defining a password space.

Referring to FIG. 21, an exemplary method 2100 for defining a password space is shown. In a providing block 2104, an image is provided, for example, an image having a variety of features as described above. Next, a determination block 2108 involves determining a tiling for the image using a Voronoi grid, for example, a tiling composed of polygons. A definition block 2112 follows wherein a password space is defined based on the tiling. Another definition block 2116 involves defining a tolerance region and/or a core region in one or more of the polygons. A display block 2120 then displays the image without displaying the Voronoi grid or the polygons. In this exemplary method, the determining a tiling optionally occurs at a remote location (e.g., at a server) and the displaying optionally occurs locally (e.g., at a client). Alternatively, the determining a tiling and displaying optionally occur locally. Further, in this exemplary method, the defining optionally occurs at a remote location (e.g., at a server) and the displaying optionally occurs locally (e.g., at a client). Alternatively, the defining and displaying optionally occur locally. Of course, a variety of local and/or remote combinations are possible for execution of the functional blocks 2104-2120. In addition, rather than displaying, the exemplary method 2100 optionally stores the image and makes it available upon request, for example, but not limited to, a request from a client (e.g., a client seeking to initiate a secure transaction, etc.).

In such an exemplary method (e.g., method 2100), image analysis optionally occurs prior to the determining a tiling. For example, image analysis optionally includes segmentation and/or weighting, such as, but not limited to, probability weighting. Image analysis optionally assists the determining a tiling and/or the defining. Further, the determining optionally uses entropy as a factor, for example, but not limited to, wherein the determining maximizes an entropy based on an entropy function, such as, but not limited to, above described entropy functions.

Figure 22:
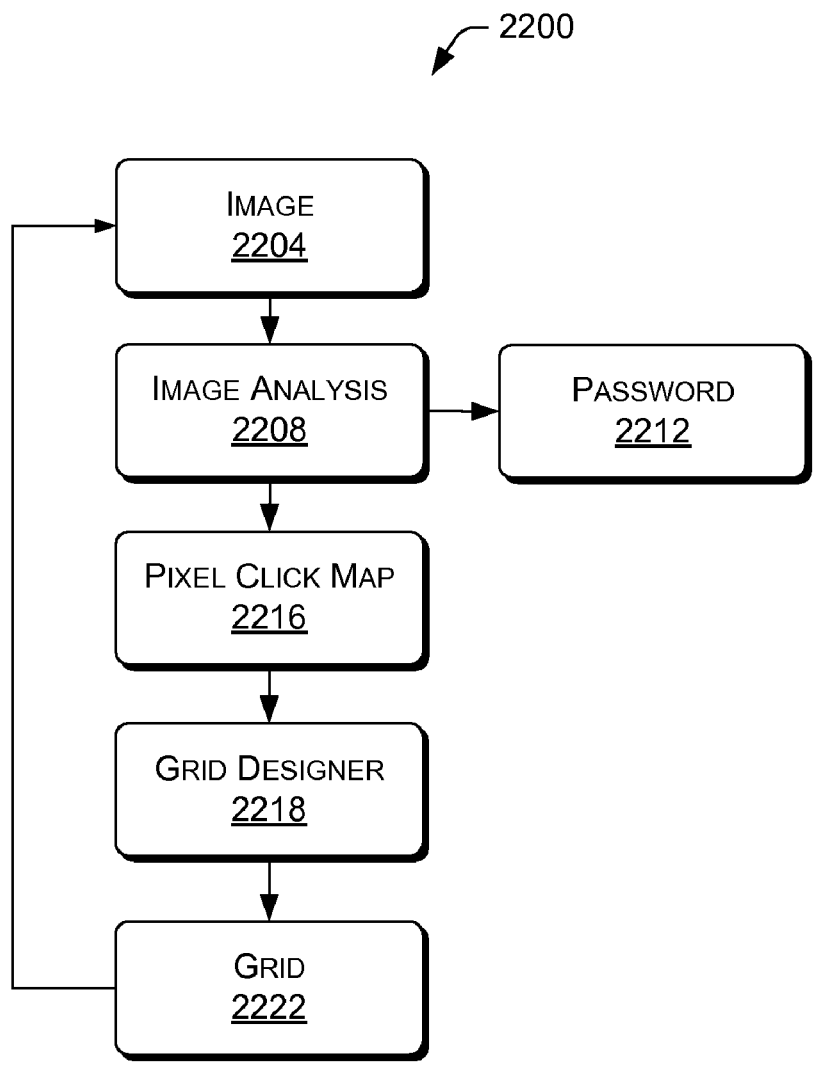
FIG. 22 is a block diagram of an exemplary password system and/or method.

Referring to FIG. 22, an exemplary password system and/or method 2200 is shown. In an image block 2204, an image is selected by a user or a system, for example, from a set of images. In an image analysis block 2208, a likelihood or probability is computed and/or otherwise assigned to discrete elements (e.g., pixels) of the image wherein the probability or likelihood characterizes whether an element will be selected as a password element at the time of password selection (e.g., see password block 2212, which optionally determines whether the image is suitable for use in a password system based on image analysis and/or other factors). Of course, image analysis optionally includes segmentation and/or other image analysis techniques. The image analysis block 2208 produces a pixel click map, as indicated by the pixel click map block 2216. The pixel click map is optionally a weight map of the picture elements (e.g., pixels), for example, but not limited to, a probability weight map that indicates a likelihood of pixel selection by a user for one or more of the pixels in the image. Next, a grid design block 2218 uses information contained in the pixel click map to design or determine a grid or tiling, as represented by the grid block 2220. A relationship or association is thereby established between the image and the grid, as represented by the line connecting the grid block 2220 and the image block 2204.

Figure 23:
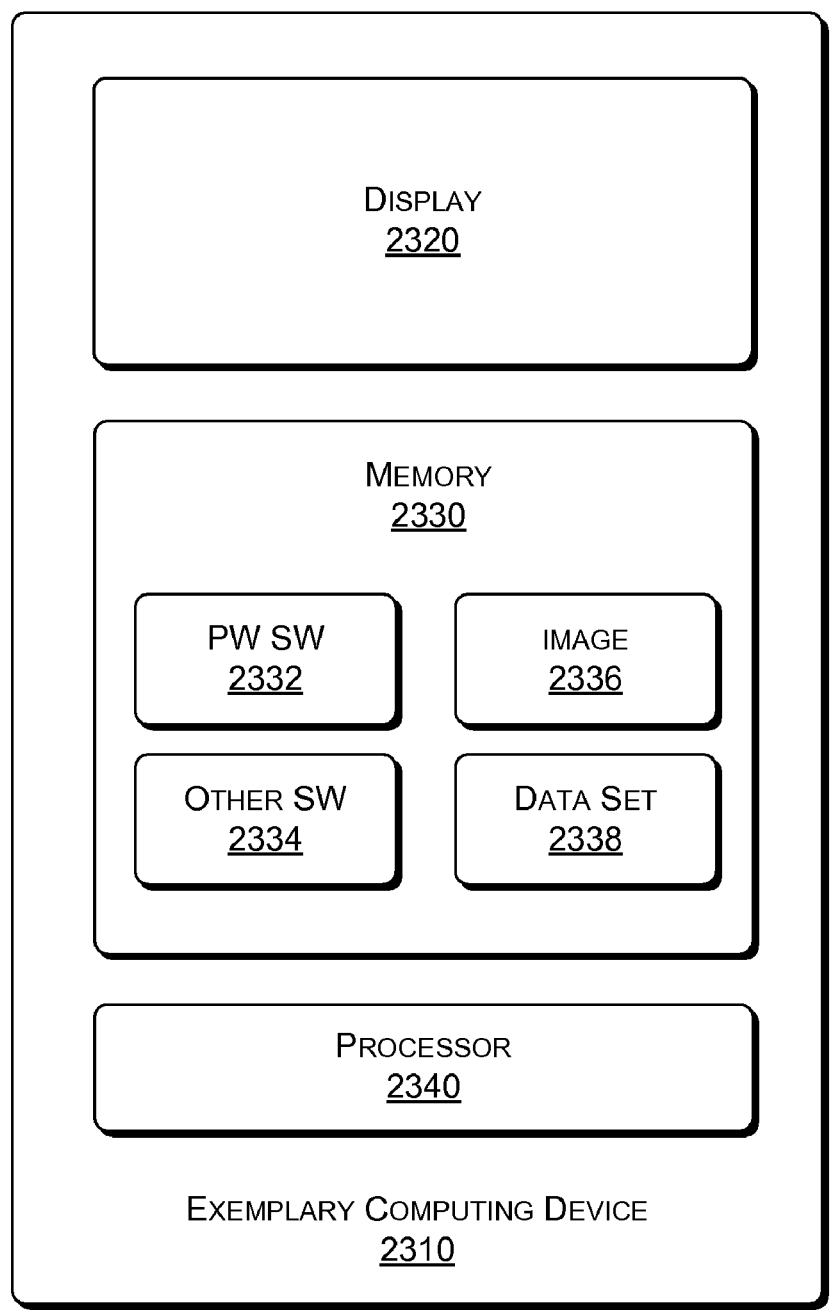
FIG. 23 is a block diagram of an exemplary computing device for use with one or more passwords.

Referring to FIG. 23, an exemplary computing device 2310 is shown. The exemplary computing device 2310 includes a display 2320, memory 2330, and a processor 2340. Of course, such an exemplary device optionally includes features shown in FIG. 1. Stored in the memory 2330 are password software 2332, for example, software capable of performing various exemplary methods described herein, equivalents thereof, etc.; other software 2334; one or more images 2336; and, if a password has been entered, a data set 2338. For example the data set 2338 optionally includes a hash value and/or offsets or transforms. In a variation of the exemplary device 2310, the data set 2338 is not stored locally (e.g., not stored in the memory 2330) but rather the data set is stored remotely, for example, at a remote computer. In this variation of the exemplary device 2310, a user uses the password software 2332 and image 2336 to logon to a remote computer (or computing device). For example, where the exemplary computing device is a PDA or the like, the password system is used to logon to a remote computer (or computing device) via the PDA. Of course, according to various exemplary systems, devices, and/or methods, one or more data sets are optionally stored locally and/or remotely at one or more locations.

Although some exemplary systems, methods and media have been illustrated in the accompanying Drawings and described in the foregoing Detailed Description, it will be understood that the methods, systems and/or media are not limited to the exemplary embodiments disclosed, but are capable of numerous rearrangements, modifications and substitutions without departing from the spirit set forth and defined by the following claims.

What is claimed is:

1. A method for tiling an image for use in an image-based password system, the method comprising:
    executing, on a processor, computer-readable instructions; and
    in response to the executing:
        providing an image, the image comprising pixels;
        providing a weight map for the image, the weight map comprising pixel weights wherein each of the weights represents a likelihood of pixel selection for a user entering an image-based password;
        providing a pixel selection tolerance; and
        tiling the image based at least in part on the weight map and the pixel selection tolerance, wherein the tiling comprises Voronoi tiling.

2. The method of claim 1 wherein the tiling further comprises generating tile information.

3. The method of claim 2, further comprising storing the tile information at a first storage location and storing the image at a different, second storage location.

4. The method of claim 3 wherein the first storage location is remote from the second storage location.

5. The method of claim 3 wherein the first storage location is remote and the second storage location is local, at an image-based password entry device.

6. The method of claim 5 wherein the image-based password entry device comprises a PDA.

7. The method of claim 1 further comprising displaying the image, entering an image-based password by selecting a series of the image pixels and associating each pixel with a tile based on the tiling.

8. The method of claim 7 further comprising authenticating the image-based password.

9. The method of claim 8 wherein the entering occurs locally and wherein the authenticating occurs remotely.

10. The method of claim 8 wherein the authenticating allows a user to access, via a network, a remote computing system.

11. A method for defining an image-based password space, the method comprising:
   executing, on a processor, computer-readable instructions; and
   in response to the executing:
      determining a tiling for an image using a Voronoi grid comprising one or more polygons, wherein the determining comprises probability weighting for weighting selection probability of regions of the image;
      defining a tolerance region or a core region for one or more of the polygons; and
      defining an image-based password space based on the tiling.

12. The method of claim 11 further comprising displaying the image without the Voronoi grid.

13. The method of claim 11 further comprising transmitting the image in response to a request for the image.

14. The method of claim 13 wherein the transmitting transmits the image from a server to a client.

15. The method of claim 14 wherein a user at the client selects one or more positions on the image.

16. The method of claim 15 wherein the one or more positions correspond to a new password and/or an established password.

* * * * *